United States Patent
Zhou et al.

(10) Patent No.: US 11,019,632 B2
(45) Date of Patent: May 25, 2021

(54) BEAM UPDATE TECHNIQUES IN BEAMFORMED WIRELESS COMMUNICATIONS

(71) Applicant: QUALCOMM Incorporated, San Diego, CA (US)

(72) Inventors: Yan Zhou, San Diego, CA (US); Tao Luo, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 16/803,588

(22) Filed: Feb. 27, 2020

(65) Prior Publication Data

US 2020/0280979 A1  Sep. 3, 2020

Related U.S. Application Data

(60) Provisional application No. 62/812,235, filed on Feb. 28, 2019.

(51) Int. Cl.
*H04W 72/04* (2009.01)
*H04B 7/06* (2006.01)

(52) U.S. Cl.
CPC ........ *H04W 72/048* (2013.01); *H04B 7/0617* (2013.01); *H04B 7/0628* (2013.01); *H04W 72/042* (2013.01); *H04W 72/046* (2013.01)

(58) Field of Classification Search
CPC ............. H04W 72/048; H04W 72/042; H04W 72/046; H04B 7/0617; H04B 7/0628
See application file for complete search history.

(56) References Cited

U.S. PATENT DOCUMENTS

2017/0155439 A1* 6/2017 Chang ................... H01Q 1/246
2018/0206132 A1* 7/2018 Guo .................. H04W 72/0473
(Continued)

OTHER PUBLICATIONS

Ericsson: "Improvements to SRS-Based UL Beam Selection", 3GPP Draft, 3GPP TSG-RAN WG1 Meeting #96, R1-1902956, Improvements to SRS-Based UL Beam Selection, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051600653, 4 pages, Retrieved from the Internet: URL: http://www.3gpp.org/ftp/tsrg%5Fran/WG1%5FRL1/TSGR1%5F96/Docs/R1%2D1902956%2Ezip. [retrieved on Feb. 15, 2019] Section 2.

(Continued)

*Primary Examiner* — Sophia Vlahos
(74) *Attorney, Agent, or Firm* — Holland & Hart LLP/Qualcomm Incorporated

(57) ABSTRACT

Methods, systems, and devices for wireless communications are described in which a UE may transmit an indication to a base station that the UE supports a beam update procedure that updates one or more beamforming parameters of one or more transmission beams. The UE may establish a connection with the base station via the one or more transmission beams. The UE may receive a medium access control (MAC) control element (CE) communication to initiate the beam update procedure, the received MAC-CE communication indicating one or more aperiodic sounding reference signal (SRS) resources to be used in the beam update procedure. The UE may perform the beam update procedure, based on the MAC-CE communication, to update one or more beamforming parameters of the one or more transmission beams.

24 Claims, 14 Drawing Sheets

(56) References Cited

U.S. PATENT DOCUMENTS

| | | | |
|---|---|---|---|
| 2019/0081751 A1* | 3/2019 | Miao | H04L 5/0048 |
| 2019/0281588 A1* | 9/2019 | Zhang | H04W 52/08 |
| 2020/0052769 A1* | 2/2020 | Cirik | H04B 7/0695 |
| 2020/0154481 A1* | 5/2020 | Goto | H04W 74/0833 |

OTHER PUBLICATIONS

Huawei, et al., "Correction to Mandatory Supported Capability Signaling", 3GPP Draft, 3GPP TSG-RAN2 Meeting#105, R2-1902308, Correction to Mandatory Supported Capability Signaling V1, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 24, 2019 (Feb. 24, 2019), XP051603637, 16 pages, Retrieved from the Internet: URL: http://www.3gpp.org/ftp/tsrg%5Fran/WG2%5FRL2/TSGR2%5F105/Docs/R2%2D1902308%2Ezip. [retrieved on Feb. 24, 2019] p. 9.

International Search Report and Written Opinion—PCT/US2020/020490—ISA/EPO—dated Jun. 9, 2020.

Ericsson: "Enhancements to Multi-Beam Operation", 3GPP Draft, R1-1902529, Enhancements to Multi-Beam Operation, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051600225, 15 pages, Retrieved from the Internet: URL: http://www.3gpp.org/ftp/tsg%5Fran/WG1%5FRL1/TSGR1%5F96/Docs/R1%2D1902529%2Ezip [retrieved on Feb. 15, 2019].

* cited by examiner

BEAM UPDATE TECHNIQUES IN BEAMFORMED WIRELESS COMMUNICATIONS

CROSS REFERENCE

The present application for patent claims the benefit of U.S. Provisional Patent Application No. 62/812,235 by ZHOU et al., entitled "BEAM UPDATE TECHNIQUES IN BEAMFORMED WIRELESS COMMUNICATIONS," filed Feb. 28, 2019, assigned to the assignee hereof, and expressly incorporated herein.

INTRODUCTION

The following relates to wireless communications, and more specifically to managing beam updates in beamformed wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may use various configurations to support wireless transmissions/receptions. For example, the configurations may be used to select or otherwise identify various parameters to be used for the wireless communications. Examples of the parameters may include, but are not limited to, the transmit power for the transmissions, modulation and coding schemes (MCS), rate matching information, and the like. In a millimeter wave (mmW) network, configuration parameters may further include spatial relation information, e.g., beam direction, beam identifier, spatial stream, and the like. The configuration parameters may be updated as needed, periodically, etc. In some cases one or more parameters may be updated in a non-periodic manner. In cases where one or more parameters are to be updated, efficient initiation and performance of one or more procedures to update the parameters may help enhance system efficiency.

SUMMARY

A method of wireless communication at a UE is described. The method may include establishing a connection with a base station via one or more transmission beams, transmitting an indication to the base station that the UE supports a beam update procedure, where the beam update procedure updates one or more beamforming parameters of the one or more transmission beams, receiving a medium access control (MAC) control element (CE) communication to initiate the beam update procedure, where the received MAC-CE communication indicates one or more aperiodic sounding reference signal (SRS) resources to be used in the beam update procedure, and performing the beam update procedure, based on the MAC-CE communication, to update one or more beamforming parameters of the one or more transmission beams.

An apparatus for wireless communication at a UE is described. The apparatus may include a processor, memory coupled with the processor, and instructions stored in the memory. The instructions may be executable by the processor to cause the apparatus to establish a connection with a base station via one or more transmission beams, transmit an indication to the base station that the UE supports a beam update procedure, where the beam update procedure updates one or more beamforming parameters of the one or more transmission beams, receive a medium access control (MAC) control element (CE) communication to initiate the beam update procedure, where the received MAC-CE communication indicates one or more aperiodic SRS resources to be used in the beam update procedure, and perform the beam update procedure, based on the MAC-CE communication, to update one or more beamforming parameters of the one or more transmission beams.

Another apparatus for wireless communication at a UE is described. The apparatus may include means for establishing a connection with a base station via one or more transmission beams, transmitting an indication to the base station that the UE supports a beam update procedure, where the beam update procedure updates one or more beamforming parameters of the one or more transmission beams, receiving a medium access control (MAC) control element (CE) communication to initiate the beam update procedure, where the received MAC-CE communication indicates one or more aperiodic SRS resources to be used in the beam update procedure, and performing the beam update procedure, based on the MAC-CE communication, to update one or more beamforming parameters of the one or more transmission beams.

A non-transitory computer-readable medium storing code for wireless communication at a UE is described. The code may include instructions executable by a processor to establish a connection with a base station via one or more transmission beams, transmit an indication to the base station that the UE supports a beam update procedure, where the beam update procedure updates one or more beamforming parameters of the one or more transmission beams, receive a medium access control (MAC) control element (CE) communication to initiate the beam update procedure, where the received MAC-CE communication indicates one or more aperiodic SRS resources to be used in the beam update procedure, and perform the beam update procedure, based on the MAC-CE communication, to update one or more beamforming parameters of the one or more transmission beams.

In some examples of the method, apparatuses, and non-transitory computer-readable medium described herein, the beam update procedure identifies updated spatial relation parameters for an uplink beam to be transmitted from the UE to the base station.

In some examples of the method, apparatuses, and non-transitory computer-readable medium described herein, the beam update procedure identifies an uplink transmission configuration indicator (TCI) state for an uplink beam to be transmitted from the UE to the base station.

In some examples of the method, apparatuses, and non-transitory computer-readable medium described herein, the indication to the base station may be transmitted in one or more of a radio resource control (RRC) message, an uplink MAC-CE, a data payload, or any combinations thereof.

In some examples of the method, apparatuses, and non-transitory computer-readable medium described herein, the performing the beam update procedure may include operations, features, means, or instructions for transmitting a set of SRSs to the base station responsive to the MAC-CE, each of the set of SRSs having different spatial relation parameters associated with a different uplink beam, and receiving an indication of one or more updated beam parameters from the base station.

A method of wireless communication at a base station is described. The method may include establishing a connection with a UE via one or more transmission beams, receiving, from the UE, an indication that the UE supports a beam update procedure, where the beam update procedure updates one or more beamforming parameters of the one or more transmission beams, transmitting a medium access control (MAC) control element (CE) communication to the UE to initiate the beam update procedure, where the MAC-CE communication to the UE indicates one or more aperiodic SRS resources to be used in the beam update procedure, and performing the beam update procedure, based on the MAC-CE communication, to update one or more beamforming parameters of the one or more transmission beams.

An apparatus for wireless communication at a base station is described. The apparatus may include a processor, memory coupled with the processor, and instructions stored in the memory. The instructions may be executable by the processor to cause the apparatus to establish a connection with a UE via one or more transmission beams, receive, from the UE, an indication that the UE supports a beam update procedure, where the beam update procedure updates one or more beamforming parameters of the one or more transmission beams, transmit a medium access control (MAC) control element (CE) communication to the UE to initiate the beam update procedure, where the MAC-CE communication to the UE indicates one or more aperiodic SRS resources to be used in the beam update procedure, and perform the beam update procedure, based on the MAC-CE communication, to update one or more beamforming parameters of the one or more transmission beams.

Another apparatus for wireless communication at a base station is described. The apparatus may include means for establishing a connection with a UE via one or more transmission beams, receiving, from the UE, an indication that the UE supports a beam update procedure, where the beam update procedure updates one or more beamforming parameters of the one or more transmission beams, transmitting a medium access control (MAC) control element (CE) communication to the UE to initiate the beam update procedure, where the MAC-CE communication to the UE indicates one or more aperiodic SRS resources to be used in the beam update procedure, and performing the beam update procedure, based on the MAC-CE communication, to update one or more beamforming parameters of the one or more transmission beams.

A non-transitory computer-readable medium storing code for wireless communication at a base station is described. The code may include instructions executable by a processor to establish a connection with a UE via one or more transmission beams, receive, from the UE, an indication that the UE supports a beam update procedure, where the beam update procedure updates one or more beamforming parameters of the one or more transmission beams, transmit a medium access control (MAC) control element (CE) communication to the UE to initiate the beam update procedure, where the MAC-CE communication to the UE indicates one or more aperiodic SRS resources to be used in the beam update procedure, and perform the beam update procedure, based on the MAC-CE communication, to update one or more beamforming parameters of the one or more transmission beams.

In some examples of the method, apparatuses, and non-transitory computer-readable medium described herein, the beam update procedure identifies updated spatial relation parameters for an uplink beam to be transmitted from the UE to the base station.

In some examples of the method, apparatuses, and non-transitory computer-readable medium described herein, the beam update procedure identifies an uplink transmission configuration indicator (TCI) state for an uplink beam to be transmitted from the UE to the base station.

In some examples of the method, apparatuses, and non-transitory computer-readable medium described herein, the indication received from the UE may be transmitted in one or more of a RRC message, an uplink MAC-CE, a data payload, or any combinations thereof.

In some examples of the method, apparatuses, and non-transitory computer-readable medium described herein, performing the beam update procedure may include operations, features, means, or instructions for measuring a set of SRSs transmitted by the UE responsive to the MAC-CE communication, each of the set of SRSs having different spatial relation parameters associated with a different beam, identifying one or more updated beam parameters based on the measuring, and transmitting an indication of the one or more updated beam parameters to the UE.

A method of wireless communication for a UE is described. The method may include a processor, memory coupled to the processor, the processor and memory configured to, transmitting an indication to the base station that the UE supports a beam update procedure, where the beam update procedure updates one or more beamforming parameters of the one or more transmission beams, receiving a medium access control (MAC) control element (CE) communication to initiate the beam update procedure, where the received MAC-CE communication indicates one or more aperiodic SRS resources to be used in the beam update procedure, and performing the beam update procedure, based on the MAC-CE communication, to update one or more beamforming parameters of the one or more transmission beams.

An apparatus for wireless communication for a UE is described. The apparatus may include a processor, memory coupled with the processor, and instructions stored in the memory. The instructions may be executable by the processor to cause the apparatus to a processor, memory coupled to the processor, the processor and memory configured to, transmit an indication to the base station that the UE supports a beam update procedure, where the beam update procedure updates one or more beamforming parameters of the one or more transmission beams, receive a medium access control (MAC) control element (CE) communication to initiate the beam update procedure, where the received MAC-CE communication indicates one or more aperiodic SRS resources to be used in the beam update procedure, and perform the beam update procedure, based on the MAC-CE communication, to update one or more beamforming parameters of the one or more transmission beams.

Another apparatus for wireless communication for a UE is described. The apparatus may include means for a processor, memory coupled to the processor, the processor and memory configured to, transmitting an indication to the base station that the UE supports a beam update procedure, where the beam update procedure updates one or more beamforming parameters of the one or more transmission beams, receiving a medium access control (MAC) control element (CE) communication to initiate the beam update procedure, where the received MAC-CE communication indicates one or more aperiodic SRS resources to be used in the beam update procedure, and performing the beam update procedure, based on the MAC-CE communication, to update one or more beamforming parameters of the one or more transmission beams.

A non-transitory computer-readable medium storing code for wireless communication for a UE is described. The code may include instructions executable by a processor to a processor, memory coupled to the processor, the processor and memory configured to, transmit an indication to the base station that the UE supports a beam update procedure, where the beam update procedure updates one or more beamforming parameters of the one or more transmission beams, receive a medium access control (MAC) control element (CE) communication to initiate the beam update procedure, where the received MAC-CE communication indicates one or more aperiodic SRS resources to be used in the beam update procedure, and perform the beam update procedure, based on the MAC-CE communication, to update one or more beamforming parameters of the one or more transmission beams.

In some examples of the method, apparatuses, and non-transitory computer-readable medium described herein, the processor and memory may be configured to identify updated spatial relation parameters for an uplink beam to be transmitted from the UE to the base station.

In some examples of the method, apparatuses, and non-transitory computer-readable medium described herein, the processor and memory may be configured to identify an uplink transmission configuration indicator (TCI) state for an uplink beam to be transmitted from the UE to the base station.

In some examples of the method, apparatuses, and non-transitory computer-readable medium described herein, the indication to the base station may be transmitted in one or more of a RRC message, an uplink MAC-CE, a data payload, or any combinations thereof.

Some examples of the method, apparatuses, and non-transitory computer-readable medium described herein may further include operations, features, means, or instructions for transmitting a set of SRSs to the base station responsive to the MAC-CE, each of the set of SRSs having different spatial relation parameters associated with a different uplink beam, and receive an indication of one or more updated beam parameters from the base station.

A method of wireless communication at a base station is described. The method may include a processor, memory coupled to the processor, the processor and memory are configured to, receiving, from the UE, an indication that the UE supports a beam update procedure, where the beam update procedure updates one or more beamforming parameters of the one or more transmission beams, transmitting a medium access control (MAC) control element (CE) communication to the UE to initiate the beam update procedure, where the MAC-CE communication to the UE indicates one or more aperiodic SRS resources to be used in the beam update procedure, and performing the beam update procedure, based on the MAC-CE communication, to update one or more beamforming parameters of the one or more transmission beams.

An apparatus for wireless communication at a base station is described. The apparatus may include a processor, memory coupled with the processor, and instructions stored in the memory. The instructions may be executable by the processor to cause the apparatus to a processor, memory coupled to the processor, the processor and memory are configured to, receive, from the UE, an indication that the UE supports a beam update procedure, where the beam update procedure updates one or more beamforming parameters of the one or more transmission beams, transmit a medium access control (MAC) control element (CE) communication to the UE to initiate the beam update procedure, where the MAC-CE communication to the UE indicates one or more aperiodic SRS resources to be used in the beam update procedure, and perform the beam update procedure, based on the MAC-CE communication, to update one or more beamforming parameters of the one or more transmission beams.

Another apparatus for wireless communication at a base station is described. The apparatus may include means for a processor, memory coupled to the processor, the processor and memory are configured to, receiving, from the UE, an indication that the UE supports a beam update procedure, where the beam update procedure updates one or more beamforming parameters of the one or more transmission beams, transmitting a medium access control (MAC) control element (CE) communication to the UE to initiate the beam update procedure, where the MAC-CE communication to the UE indicates one or more aperiodic SRS resources to be used in the beam update procedure, and performing the beam update procedure, based on the MAC-CE communication, to update one or more beamforming parameters of the one or more transmission beams.

A non-transitory computer-readable medium storing code for wireless communication at a base station is described. The code may include instructions executable by a processor to a processor, memory coupled to the processor, the processor and memory are configured to, receive, from the UE, an indication that the UE supports a beam update procedure, where the beam update procedure updates one or more beamforming parameters of the one or more transmission beams, transmit a medium access control (MAC) control element (CE) communication to the UE to initiate the beam update procedure, where the MAC-CE communication to the UE indicates one or more aperiodic SRS resources to be used in the beam update procedure, and perform the beam update procedure, based on the MAC-CE communication, to update one or more beamforming parameters of the one or more transmission beams.

In some examples of the method, apparatuses, and non-transitory computer-readable medium described herein, the processor and memory may be configured to identify updated spatial relation parameters for an uplink beam to be transmitted from the UE to the base station.

In some examples of the method, apparatuses, and non-transitory computer-readable medium described herein, the processor and memory may be configured to identify an uplink transmission configuration indicator (TCI) state for an uplink beam to be transmitted from the UE to the base station.

In some examples of the method, apparatuses, and non-transitory computer-readable medium described herein, the indication received from the UE may be transmitted in one or more of a RRC message, an uplink MAC-CE, a data payload, or any combinations thereof.

Some examples of the method, apparatuses, and non-transitory computer-readable medium described herein may further include operations, features, means, or instructions for measuring a set of SRSs transmitted by the UE responsive to the MAC-CE communication, each of the set of SRSs having different spatial relation parameters associated with a different beam, identify one or more updated beam parameters based on the measuring, and transmit an indication of the one or more updated beam parameters to the UE.

DETAILED DESCRIPTION

Figure 1:
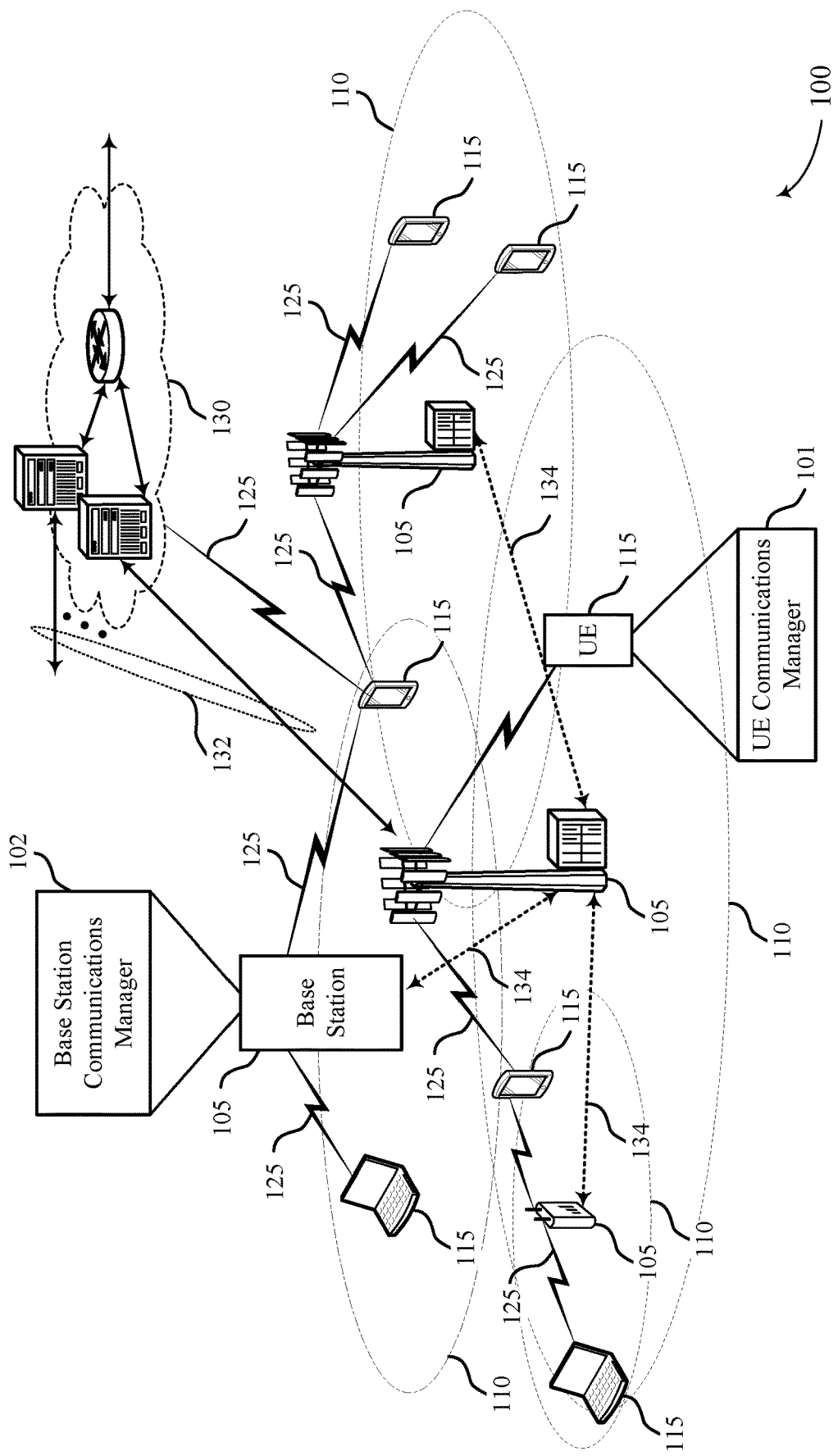
FIG. 1 illustrates an example of a system for wireless communications that supports beam update techniques in beamformed wireless communications in accordance with aspects of the present disclosure.

Various aspects of the present disclosure relate to methods, systems, devices, and apparatuses that support efficient beam update techniques in beamformed wireless communications between a UE and a base station. In some cases, a base station and a UE may establish a connection using one or more beamformed transmission beams. The UE and base station may periodically perform beam refinement procedures or beam training procedures and may update the transmission beams used for communications based on such procedures. For example, UE movement relative to the base station may result in one or more different transmission beams being selected for subsequent communications. In some cases, the UE may identify that signal quality of a transmission beam being used for communications with the base station has degraded and may initiate a beam training procedure, or beam update procedure, through transmission of a beam training request. In some cases, the base station may identify that signal quality of an uplink transmission beam has degraded and may initiate a beam training procedure or beam update procedure.

In some cases, an uplink beam update procedure may be performed by the UE transmitting two or more SRSs according to various spatial transmission parameters, which may also be referred to as beamforming parameters. The base station may measure received SRSs and identify a preferred SRS (e.g., based on signal strength, signal quality, signal-to-noise ratio, signal-to-interference and noise ratio, etc.). The base station may then transmit an indication of the preferred SRS, and associated spatial transmission parameters or beamforming parameters, for use in subsequent communications between the UE and the base station. In some cases, the beam update procedure may be initiated by the base station transmitting a MAC-CE to the UE. The MAC-CE may include one or more parameters associated with the SRSs that are to be transmitted by the UE to the base station in the beam update procedure.

In some cases, the spatial relation of the uplink beam may be based on spatial relation parameters defined for SRS resources in a SRS resource set that is to be used for a beam update procedure or beam training procedure. In some cases, the base station may trigger an SRS beam sweep (e.g., in a MAC-CE that includes an indication of the SRS resources set with SRS-SetUse='BeamManagement'), and the UE will transmit different SRS resources in different uplink transmit beams.

According to some aspects of the present disclosure, the UE may transmit an indication to the base station that the UE supports a beam update procedure that is initiated by a MAC-CE communication to update one or more beamforming parameters. The UE in such cases may receive a MAC-CE communication that triggers the beam update procedure, and perform the beam update procedure, based on the MAC-CE communication, to update one or more beamforming parameters. For example, a UE may indicate to the base station the support of MAC-CE based spatial relation updates for aperiodic SRS per resource level. The aperiodic SRS resource may be used at least for the purpose of uplink beam management, and a number of SRS parameters may be indicated in the MAC-CE communication from the base station. In some cases, the UE may transmit the indication to the base station in a RRC signaling message, an uplink MAC-CE, a data payload in an uplink transmission, or any combinations thereof.

Such techniques may allow for transmission beams to be updated more quickly when an existing transmission beam quality has degraded, and thus provide more efficient and reliable communications. Such techniques may be employed, in some examples, in system that uses beamforming and where a UE is moving between different beams. Accordingly, techniques such as discussed herein may enhance beam switching procedures for such situations through faster and more efficient beam switching. Further, allowing a UE to indicate whether it supports triggering of a beam update procedure in a MAC-CE may allow for efficient identification by the base station of UEs that are capable of aperiodic update procedures based on MAC-CE triggers.

Aspects of the disclosure are initially described in the context of a wireless communications system. Aspects of the disclosure are further illustrated by and described with reference to apparatus diagrams, system diagrams, and flowcharts that relate to beam update techniques in beamformed wireless communications.

FIG. 1 illustrates an example of a wireless communications system 100 that supports beam update techniques in beamformed wireless communications in accordance with aspects of the present disclosure. The wireless communications system 100 includes base stations 105, UEs 115, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. A UE 115 may communicate with the core network 130 through a communication link 125. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

One of more of the UEs 115 may include a UE communications manager 101, which in some cases may establish a connection with a base station 105 via one or more transmission beams, transmit an indication to the base station 105 that the UE 115 supports a beam update procedure, wherein the beam update procedure updates one or more beamforming parameters of the one or more transmission beams, receive a MAC-CE communication to initiate the beam update procedure, wherein the received MAC-CE communication indicates one or more aperiodic SRS resources to be used in the beam update procedure, and perform the beam update procedure, based at least in part on the MAC-CE communication, to update one or more beamforming parameters of the one or more transmission beams.

One or more base stations 105 may include a base station communications manager 102, which may establish a connection with a UE 115 via one or more transmission beams, receive, from the UE 115, an indication that the UE 115 supports a beam update procedure, wherein the beam update procedure updates one or more beamforming parameters of the one or more transmission beams, transmit a MAC-CE communication to the UE 115 to initiate the beam update procedure, wherein the MAC-CE communication to the UE 115 indicates one or more aperiodic SRS resources to be used in the beam update procedure, and perform the beam update procedure, based at least in part on the MAC-CE communication, to update one or more beamforming parameters of the one or more transmission beams.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, and may operate in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 and base station 105 may use beamformed transmissions for uplink and downlink communications. In such cases, beam update procedures may be conducted to maintain reliable communications. In some cases, a UE 115 may transmit an indication to a base station 105 that the UE 115 supports a beam update procedure that is initiated by a MAC-CE communication. The UE 115 in such cases may receive a MAC-CE communication that triggers the beam update procedure, and perform the beam update procedure, based on the MAC-CE communication, to update one or more beamforming parameters. The base station 105 that is serving the UE 115 may identify that the UE 115 is capable of triggering a beam update through a MAC-CE communication, and may use such a MAC-CE communication to trigger a beam update in the event that a beam used for communications has degraded (e.g., when a reference signal received power (RSRP) drops below a threshold value).

Figure 2:
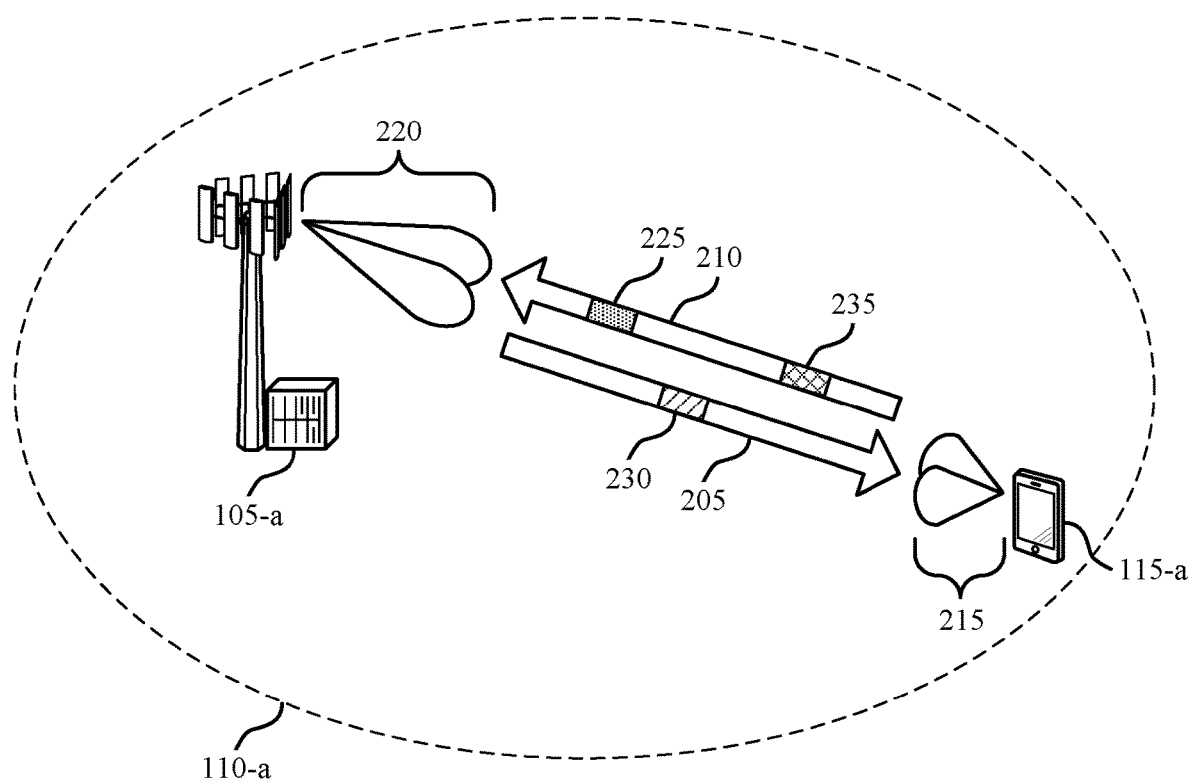
FIG. 2 illustrates an example of a wireless communications system that supports beam update techniques in beamformed wireless communications in accordance with aspects of the present disclosure.

FIG. 2 illustrates an example of a wireless communications system 200 that supports beam update techniques in beamformed wireless communications in accordance with aspects of the present disclosure. In some examples, wireless communications system 200 may implement aspects of wireless communication system 100. In the example of FIG. 2, wireless communications system 200 may include base station 105-a and UE 115-a, which may be examples of the corresponding devices described with respect to FIG. 1. Base station 105-a may provide network coverage for geographic coverage area 110-a. In this example, UE 115-a and base station 105-a may use beamformed communications to establish a downlink connection 205 via a downlink beam 220 and an uplink connection 210 via an uplink beam 215.

In some cases, base station 105-a and UE 115-a may establish communication via a beam pair link. In some cases, the UE 115-a and base station 105-a may use corresponding beamforming parameters (e.g., spatial transmission or receive parameters) associated with a particular transmission beam to configure wireless communications hardware for transmitting/receiving beamformed transmissions in which a beam pair link may have coupled transmission beams with corresponding beamforming parameters. In other cases, uplink beams and downlink beams may be uncoupled. The beamforming parameters may include a particular spatial domain filter for uplink or downlink communications that is associated with a particular transmission beam. In cases with coupled transmission beams, the beamforming parameters of an uplink beam may be determined based on one or more reference signals that are received on a selected downlink beam which is quasi co-located (QCL) with the uplink beam. Two antenna ports are said to be QCL if properties of the channel over which a symbol on one antenna port is conveyed can be inferred from the channel over which a symbol on the other antenna port is conveyed.

In some cases, one or more beam pair links may be established through a beam sweep and beam refinement procedure in which the UE 115-a may measure one or more reference signals from the base station 105-a (e.g., channel state information reference signal (CSI-RS) transmissions) and provide measurement reports to the base station 105-a that are used to determine the beam pair links (BPL). Systems that employ transmission beams may use measurements related to multiple beams to identify a best, or most preferred beam to use in a BPL. For example, a first wireless device (e.g., base station 105-a) may perform a beam sweep (e.g., a P1 beam training procedure) in which consecutive beams having a relatively wide beam width are transmitted and may be measured at a second wireless device (e.g., UE 115-a) to identify a best beam (e.g., a beam with a highest RSRP) and provide an indication to the first wireless device of the preferred beam. In some cases, further beam refinements may be performed in which the first wireless device may transmit one or more reference signals (e.g., a channel state information (CSI) reference signal (CSI-RS) in a P2 (for downlink beams) and/or P3 (for uplink beams) beam training procedure to identify more focused beams for use in BPLs. In cases where a refined uplink beam is to be determined, the UE may transmit a number of SRS transmissions that may be measured to identify a preferred beam or beams.

After establishment of one or more BPLs, the UE 115-a and base station 105-a may periodically perform beam refinement procedures (e.g., one or more of P1, P2, or P3 procedures) to help maintain communications using reliable transmission beams. In some cases, the base station 105-a may initiate an uplink beam update procedure by transmitting a MAC-CE communication 230, which may indicate SRS resources for one or more subsequent SRS transmissions 235 from the UE 115-a that may be used by the base station 105-a to identify a preferred beam. In various aspects of the present disclosure, the UE 115-a may transmit a capability indication 225 to the base station 105-a that indicates a capability of the UE 115-a to trigger aperiodic SRS transmissions based on the MAC-CE communication 230. The base station 105-a, in such cases, may trigger such aperiodic SRS transmissions for a beam update procedure based on the indicated capability of the UE 115-a. For example, the UE 115-*a* may indicate to the base station the support of MAC-CE based spatial relation updates for aperiodic SRS (e.g., SRSs 235) per resource level. An aperiodic SRS resource may be used at least for the purpose of uplink beam management, and a number of SRS parameters may be indicated in the MAC-CE communication 230 from the base station 105-*a*. In some cases, the UE 115-*a* may transmit the capability indication 225 to the base station 105-*a* in a RRC signaling message, an uplink MAC-CE, a data payload in an uplink transmission, or any combinations thereof.

Figure 3:
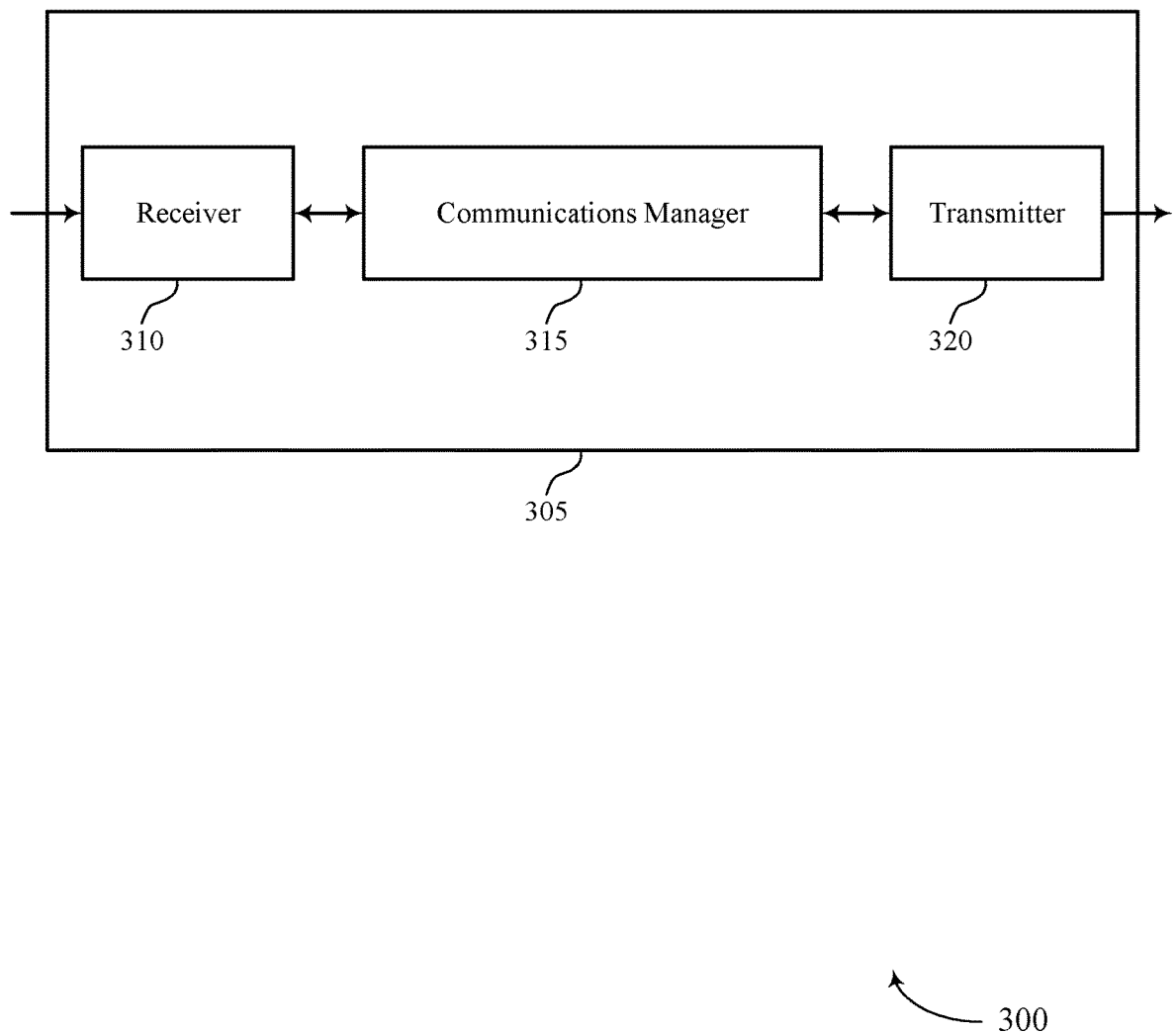
FIGS. 3 and 4 show block diagrams of devices that support beam update techniques in beamformed wireless communications in accordance with aspects of the present disclosure.

FIG. 3 shows a block diagram 300 of a device 305 that supports beam update techniques in beamformed wireless communications in accordance with aspects of the present disclosure. The device 305 may be an example of aspects of a UE 115 as described herein. The device 305 may include a receiver 310, a communications manager 315, and a transmitter 320. The device 305 may also include a processor. Each of these components may be in communication with one another (e.g., via one or more buses).

The receiver 310 may receive information such as packets, user data, or control information associated with various information channels (e.g., control channels, data channels, and information related to beam update techniques in beamformed wireless communications, etc.). Information may be passed on to other components of the device 305. The receiver 310 may be an example of aspects of the transceiver 620 described with reference to FIG. 6. The receiver 310 may utilize a single antenna or a set of antennas.

The communications manager 315 may establish a connection with a base station via one or more transmission beams, transmit an indication to the base station that the UE supports a beam update procedure that is initiated by a MAC-CE communication to update one or more beamforming parameters of the one or more transmission beams, receive the MAC-CE communication to initiate the beam update procedure, the received MAC-CE communication indicating one or more aperiodic SRS resources to be used in the beam update procedure, and perform the beam update procedure, based on the MAC-CE communication, to update one or more beamforming parameters of the one or more transmission beams. The communications manager 315 may be an example of aspects of the communications manager 610 described herein.

The communications manager 315, or its sub-components, may be implemented in hardware, code (e.g., software or firmware) executed by a processor, or any combination thereof. If implemented in code executed by a processor, the functions of the communications manager 315, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 315, or its sub-components, may be physically located at various positions, including being distributed such that portions of functions are implemented at different physical locations by one or more physical components. In some examples, the communications manager 315, or its sub-components, may be a separate and distinct component in accordance with various aspects of the present disclosure. In some examples, the communications manager 315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 320 may transmit signals generated by other components of the device 305. In some examples, the transmitter 320 may be collocated with a receiver 310 in a transceiver module. For example, the transmitter 320 may be an example of aspects of the transceiver 620 described with reference to FIG. 6. The transmitter 320 may utilize a single antenna or a set of antennas.

Figure 4:
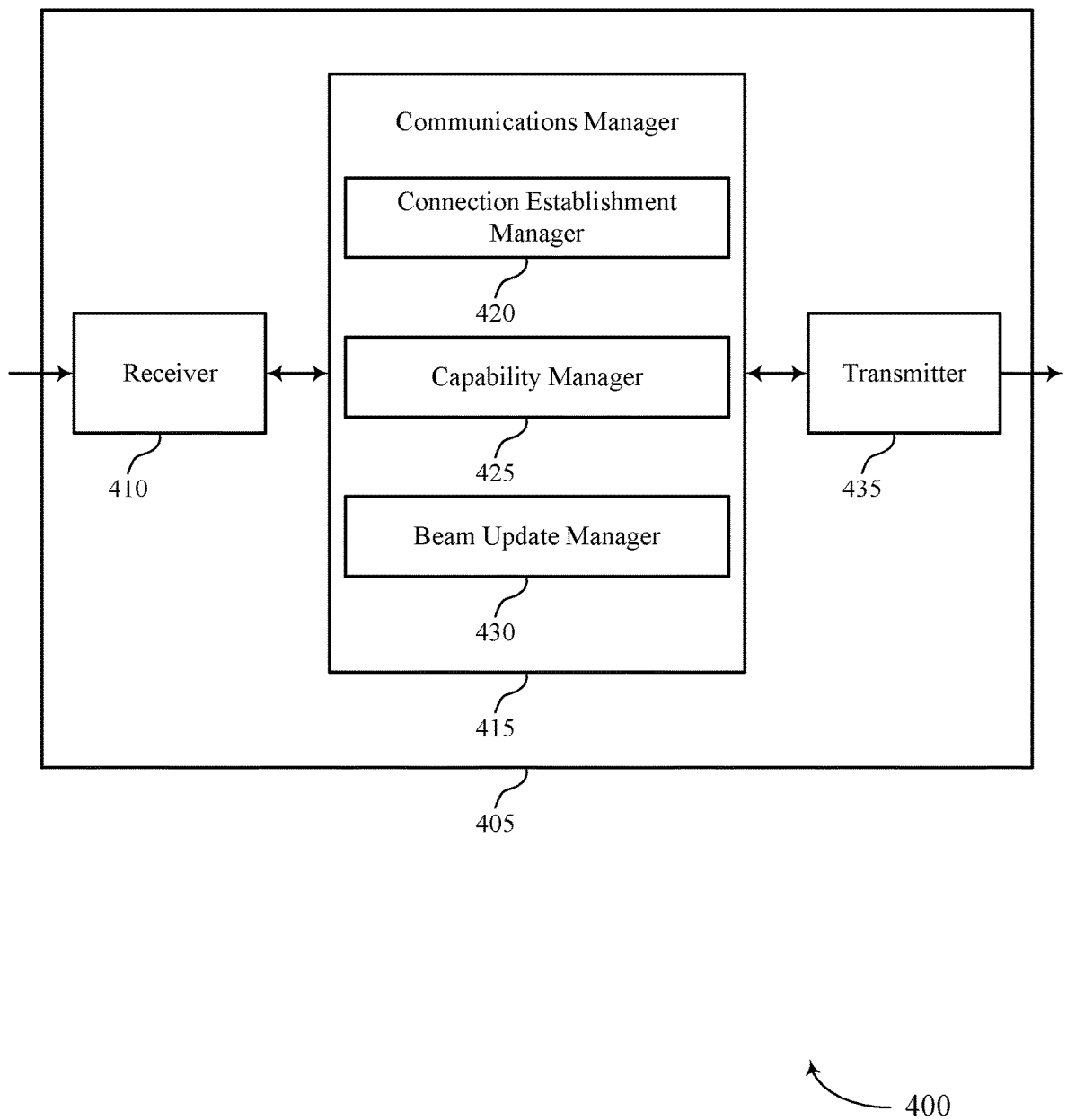

FIG. 4 shows a block diagram 400 of a device 405 that supports beam update techniques in beamformed wireless communications in accordance with aspects of the present disclosure. The device 405 may be an example of aspects of a device 305, or a UE 115 as described herein. The device 405 may include a receiver 410, a communications manager 415, and a transmitter 435. The device 405 may also include a processor. Each of these components may be in communication with one another (e.g., via one or more buses).

The receiver 410 may receive information such as packets, user data, or control information associated with various information channels (e.g., control channels, data channels, and information related to beam update techniques in beamformed wireless communications, etc.). Information may be passed on to other components of the device 405. The receiver 410 may be an example of aspects of the transceiver 620 described with reference to FIG. 6. The receiver 410 may utilize a single antenna or a set of antennas.

The communications manager 415 may be an example of aspects of the communications manager 315 as described herein. The communications manager 415 may include a connection establishment manager 420, a capability manager 425, and a beam update manager 430. The communications manager 415 may be an example of aspects of the communications manager 610 described herein.

The connection establishment manager 420 may establish a connection with a base station via one or more transmission beams.

The capability manager 425 may transmit an indication to the base station that the UE supports a beam update procedure that is initiated by a MAC-CE communication to update one or more beamforming parameters of the one or more transmission beams.

The beam update manager 430 may receive the MAC-CE communication to initiate the beam update procedure, the received MAC-CE communication indicating one or more aperiodic SRS resources to be used in the beam update procedure, and perform the beam update procedure, based on the MAC-CE communication, to update one or more beamforming parameters of the one or more transmission beams.

The transmitter 435 may transmit signals generated by other components of the device 405. In some examples, the transmitter 435 may be collocated with a receiver 410 in a transceiver module. For example, the transmitter 435 may be an example of aspects of the transceiver 620 described with reference to FIG. 6. The transmitter 435 may utilize a single antenna or a set of antennas.

Figure 5:
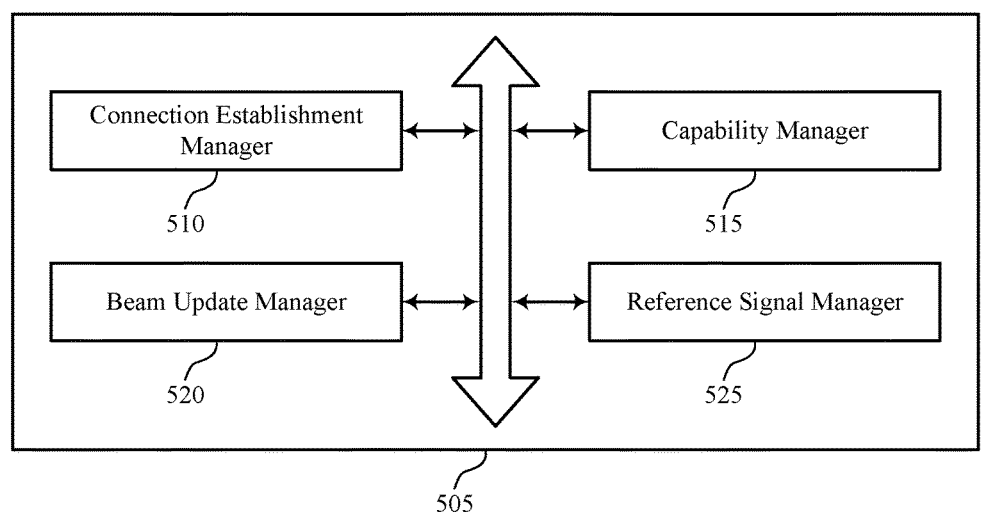
FIG. 5 shows a block diagram of a communications manager that supports beam update techniques in beamformed wireless communications in accordance with aspects of the present disclosure.

FIG. 5 shows a block diagram 500 of a communications manager 505 that supports beam update techniques in beamformed wireless communications in accordance with aspects of the present disclosure. The communications manager 505 may be an example of aspects of a communications manager 315, a communications manager 415, or a communications manager 610 described herein. The communications manager 505 may include a connection establishment manager 510, a capability manager 515, a beam update manager 520, and a reference signal manager 525. Each of these modules may communicate, directly or indirectly, with one another (e.g., via one or more buses).

The connection establishment manager 510 may establish a connection with a base station via one or more transmission beams.

The capability manager 515 may transmit an indication to the base station that the UE supports a beam update procedure that is initiated by a MAC-CE communication to update one or more beamforming parameters of the one or more transmission beams. In some cases, the indication to the base station is transmitted in one or more of a RRC message, an uplink MAC-CE, a data payload, or any combinations thereof.

The beam update manager 520 may receive the MAC-CE communication to initiate the beam update procedure, the received MAC-CE communication indicating one or more aperiodic SRS resources to be used in the beam update procedure. In some examples, the beam update manager 520 may perform the beam update procedure, based on the MAC-CE communication, to update one or more beamforming parameters of the one or more transmission beams. In some examples, the beam update manager 520 may receive an indication of one or more updated beam parameters from the base station. In some cases, the beam update procedure identifies updated spatial relation parameters for an uplink beam to be transmitted from the UE to the base station. In some cases, the beam update procedure identifies an uplink transmission configuration indicator (TCI) for an uplink beam to be transmitted from the UE to the base station.

The reference signal manager 525 may transmit a set of SRSs to the base station responsive to the MAC-CE, each of the set of SRSs having different spatial relation parameters associated with a different uplink beam.

Figure 6:
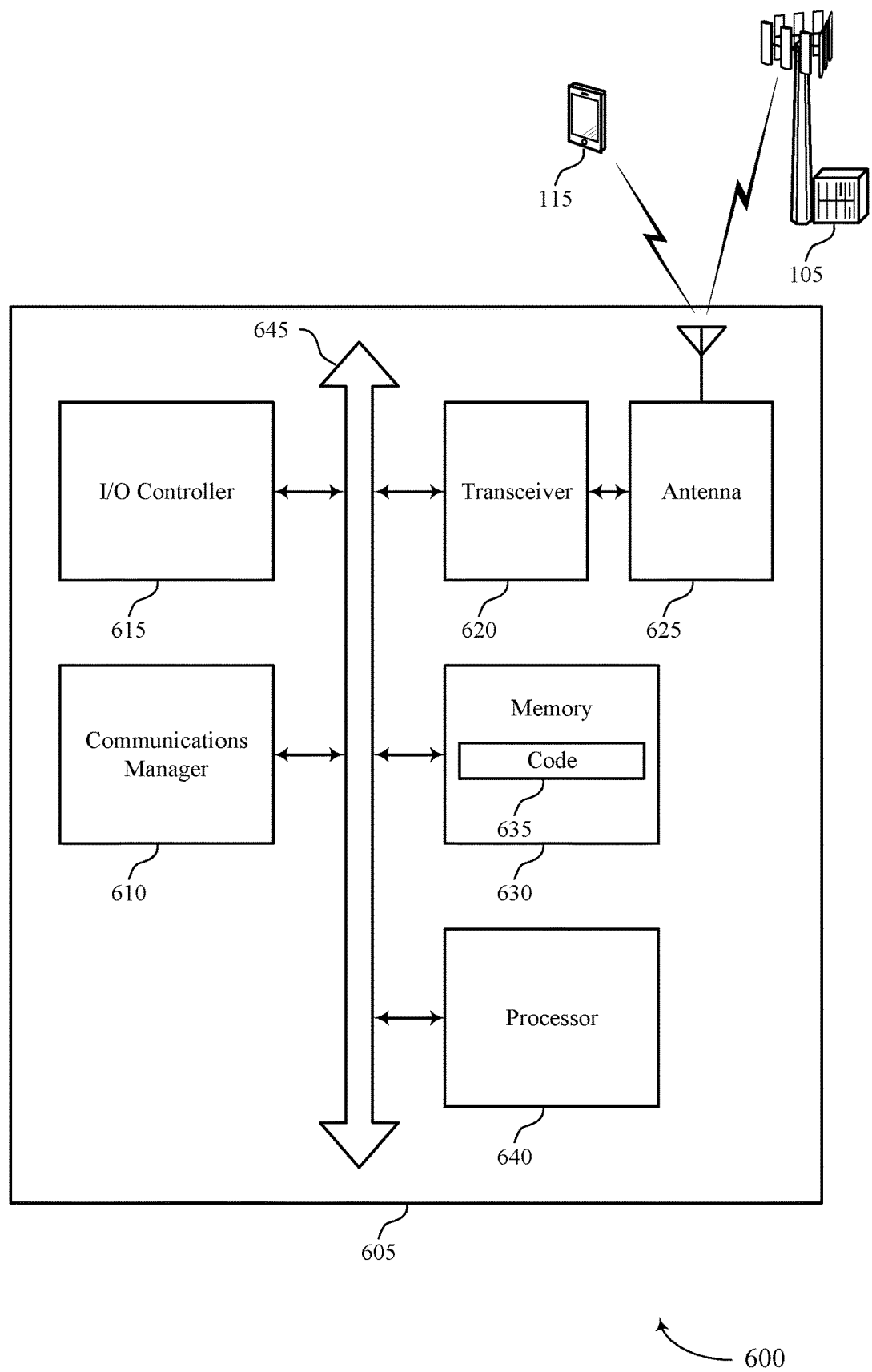
FIG. 6 shows a diagram of a system including a device that supports beam update techniques in beamformed wireless communications in accordance with aspects of the present disclosure.

FIG. 6 shows a diagram of a system 600 including a device 605 that supports beam update techniques in beamformed wireless communications in accordance with aspects of the present disclosure. The device 605 may be an example of or include the components of device 305, device 405, or a UE 115 as described herein. The device 605 may include components for bi-directional voice and data communications including components for transmitting and receiving communications, including a communications manager 610, an I/O controller 615, a transceiver 620, an antenna 625, memory 630, and a processor 640. These components may be in electronic communication via one or more buses (e.g., bus 645).

The communications manager 610 may establish a connection with a base station via one or more transmission beams, transmit an indication to the base station that the UE supports a beam update procedure that is initiated by a MAC-CE communication to update one or more beamforming parameters of the one or more transmission beams, receive the MAC-CE communication to initiate the beam update procedure, the received MAC-CE communication indicating one or more aperiodic SRS resources to be used in the beam update procedure, and perform the beam update procedure, based on the MAC-CE communication, to update one or more beamforming parameters of the one or more transmission beams.

The I/O controller 615 may manage input and output signals for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the device 605 via the I/O controller 615 or via hardware components controlled by the I/O controller 615.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas.

In some cases, the wireless device may include a single antenna 625. However, in some cases the device may have more than one antenna 625, which may be capable of concurrently transmitting or receiving multiple wireless transmissions.

The memory 630 may include random-access memory (RAM) and read-only memory (ROM). The memory 630 may store computer-readable, computer-executable code 635 including instructions that, when executed, cause the processor to perform various functions described herein. In some cases, the memory 630 may contain, among other things, a basic input/output system (BIOS) which may control basic hardware or software operation such as the interaction with peripheral components or devices.

The processor 640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the device 605 to perform various functions (e.g., functions or tasks supporting beam update techniques in beamformed wireless communications).

The code 635 may include instructions to implement aspects of the present disclosure, including instructions to support wireless communications. The code 635 may be stored in a non-transitory computer-readable medium such as system memory or other type of memory. In some cases, the code 635 may not be directly executable by the processor 640 but may cause a computer (e.g., when compiled and executed) to perform functions described herein.

Figure 7:
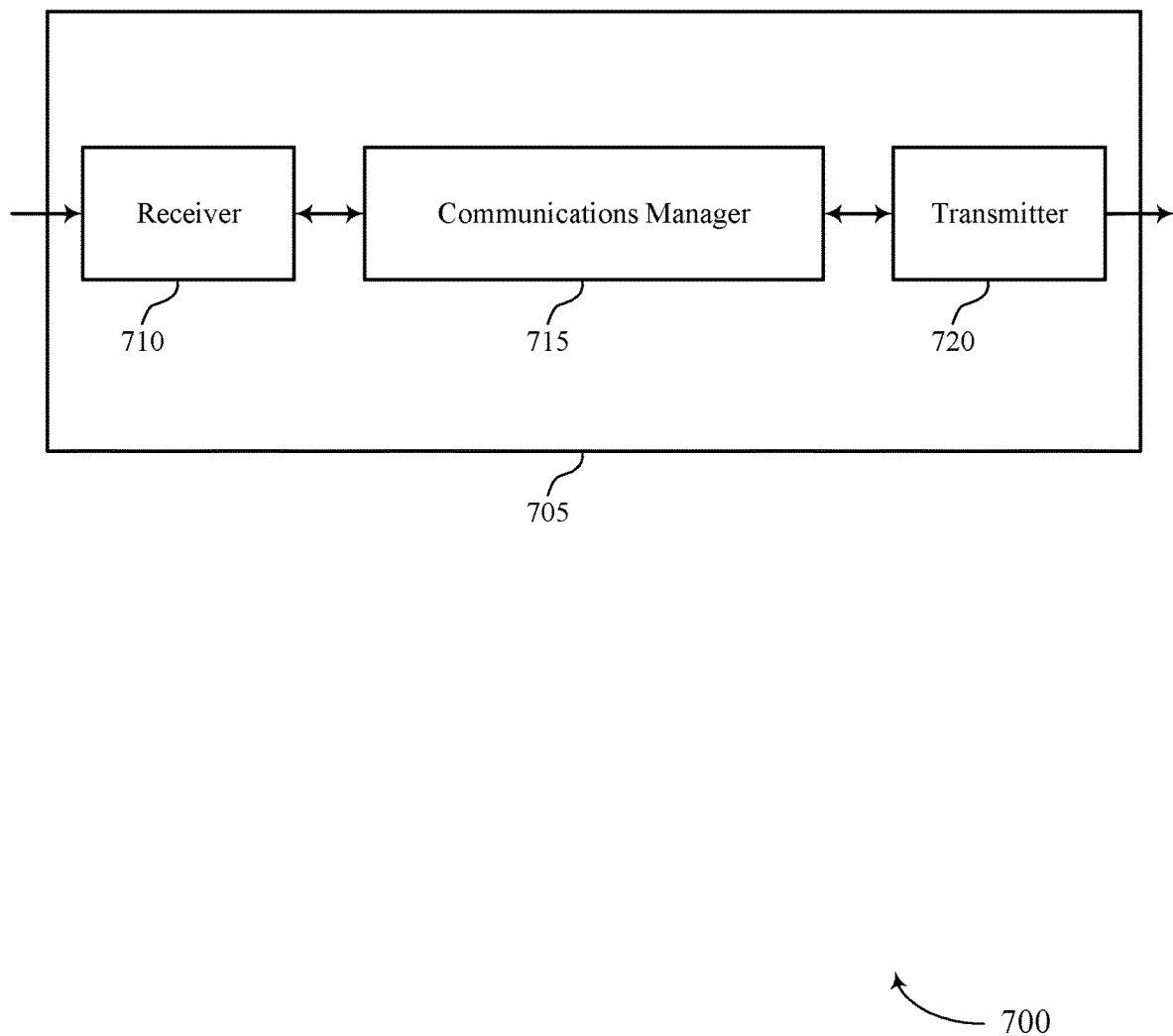
FIGS. 7 and 8 show block diagrams of devices that support beam update techniques in beamformed wireless communications in accordance with aspects of the present disclosure.

FIG. 7 shows a block diagram 700 of a device 705 that supports beam update techniques in beamformed wireless communications in accordance with aspects of the present disclosure. The device 705 may be an example of aspects of a base station 105 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to beam update techniques in beamformed wireless communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may establish a connection with a UE via one or more transmission beams, receive, from the UE, an indication that the UE supports a beam update procedure that is initiated by a MAC-CE communication to update one or more beamforming parameters of the one or more transmission beams, transmit the MAC-CE communication to the UE to initiate the beam update procedure, the MAC-CE communication to the UE indicating one or more aperiodic SRS resources to be used in the beam update procedure, and perform the beam update procedure, based on the MAC-CE communication, to update one or more beamforming parameters of the one or more transmission beams. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
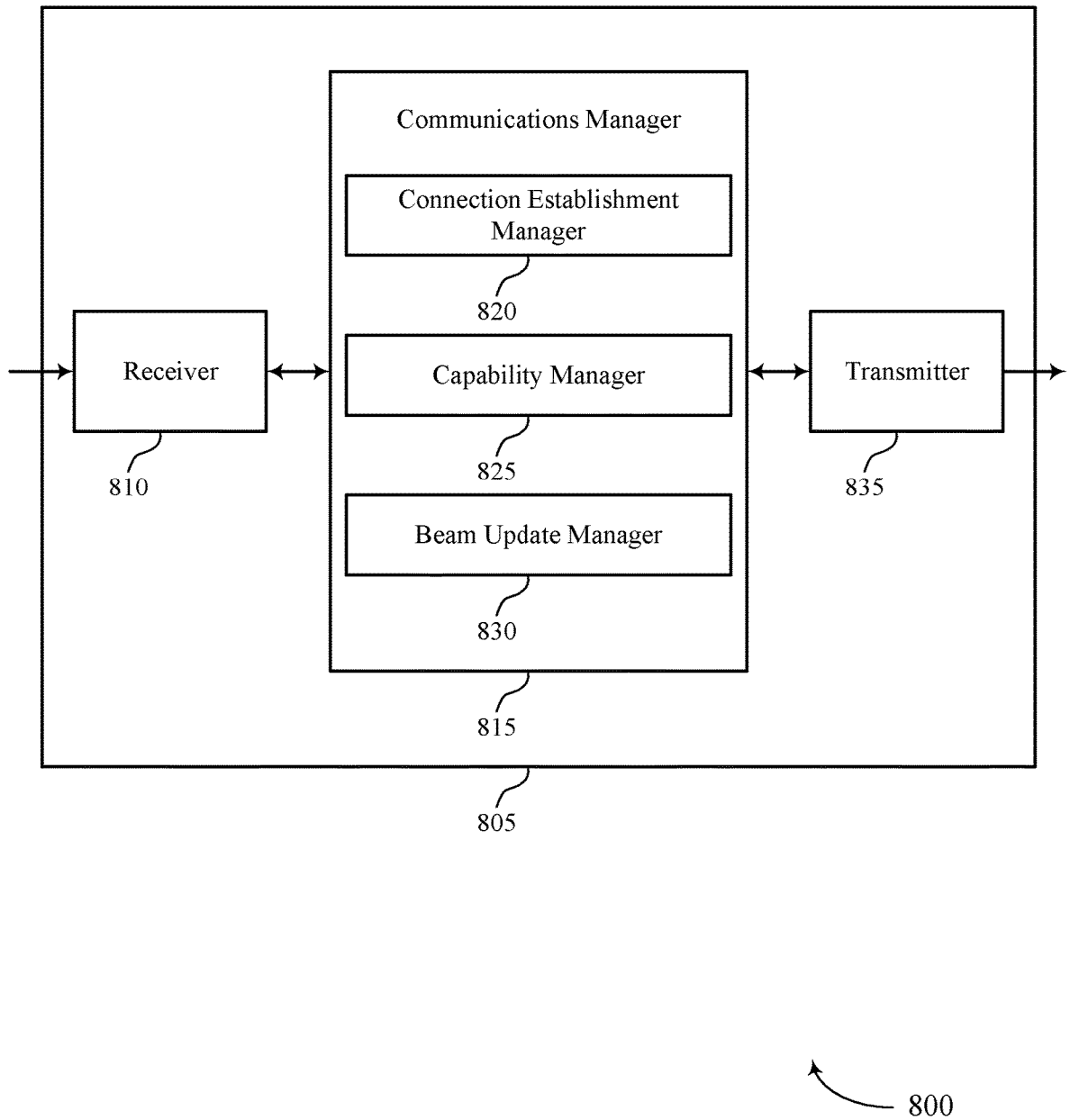

FIG. 8 shows a block diagram 800 of a device 805 that supports beam update techniques in beamformed wireless communications in accordance with aspects of the present disclosure. The device 805 may be an example of aspects of a device 705, or a base station 105 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to beam update techniques in beamformed wireless communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a connection establishment manager 820, a capability manager 825, and a beam update manager 830. The communications manager 815 may be an example of aspects of the communications manager 1010 described herein.

The connection establishment manager 820 may establish a connection with a UE via one or more transmission beams.

The capability manager 825 may receive, from the UE, an indication that the UE supports a beam update procedure that is initiated by a MAC-CE communication to update one or more beamforming parameters of the one or more transmission beams.

The beam update manager 830 may transmit the MAC-CE communication to the UE to initiate the beam update procedure the MAC-CE communication to the UE indicating one or more aperiodic SRS resources to be used in the beam update procedure, and perform the beam update procedure, based on the MAC-CE communication, to update one or more beamforming parameters of the one or more transmission beams.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
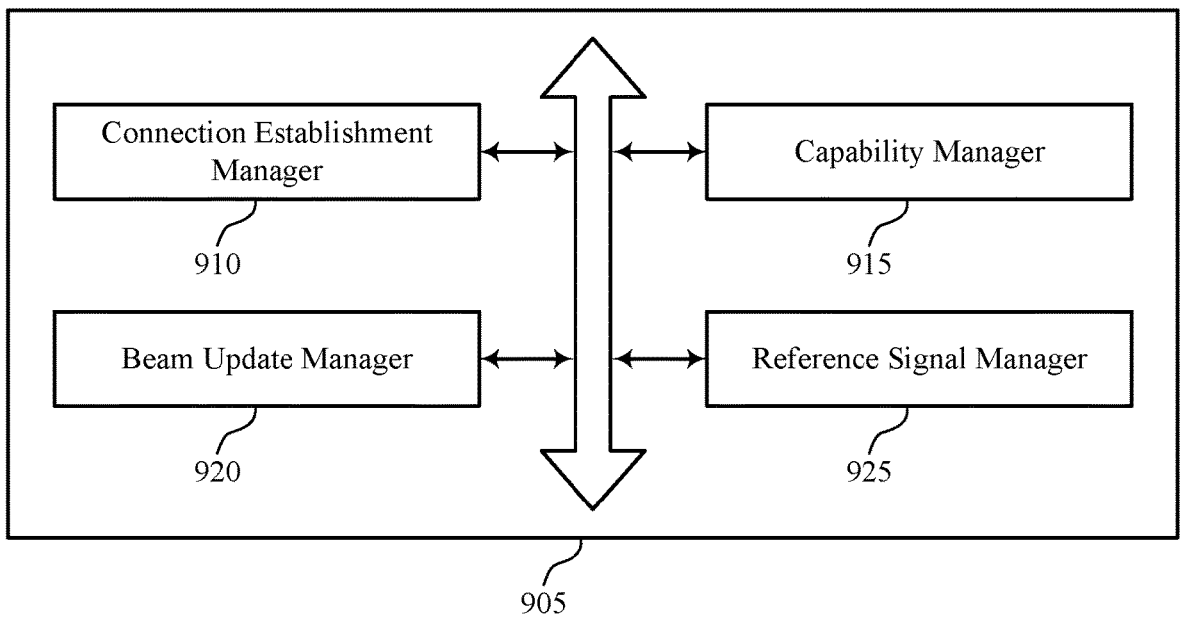
FIG. 9 shows a block diagram of a communications manager that supports beam update techniques in beamformed wireless communications in accordance with aspects of the present disclosure.

FIG. 9 shows a block diagram 900 of a communications manager 905 that supports beam update techniques in beamformed wireless communications in accordance with aspects of the present disclosure. The communications manager 905 may be an example of aspects of a communications manager 715, a communications manager 815, or a communications manager 1010 described herein. The communications manager 905 may include a connection establishment manager 910, a capability manager 915, a beam update manager 920, and a reference signal manager 925. Each of these modules may communicate, directly or indirectly, with one another (e.g., via one or more buses).

The connection establishment manager 910 may establish a connection with a UE via one or more transmission beams.

The capability manager 915 may receive, from the UE, an indication that the UE supports a beam update procedure that is initiated by a MAC-CE communication to update one or more beamforming parameters of the one or more transmission beams. In some cases, the indication received from the UE is transmitted in one or more of a RRC message, an uplink MAC-CE, a data payload, or any combinations thereof.

The beam update manager 920 may transmit the MAC-CE communication to the UE to initiate the beam update procedure the MAC-CE communication to the UE indicating one or more aperiodic SRS resources to be used in the beam update procedure. In some examples, the beam update manager 920 may perform the beam update procedure, based on the MAC-CE communication, to update one or more beamforming parameters of the one or more transmission beams. In some examples, the beam update manager 920 may identify one or more updated beam parameters based on the measuring. In some examples, the beam update manager 920 may transmit an indication of the one or more updated beam parameters to the UE. In some cases, the beam update procedure identifies updated spatial relation parameters for an uplink beam to be transmitted from the UE to the base station. In some cases, the beam update procedure identifies an uplink TCI for an uplink beam to be transmitted from the UE to the base station.

The reference signal manager 925 may measure a set of SRSs transmitted by the UE responsive to the MAC-CE communication, each of the set of SRSs having different spatial relation parameters associated with a different beam.

Figure 10:
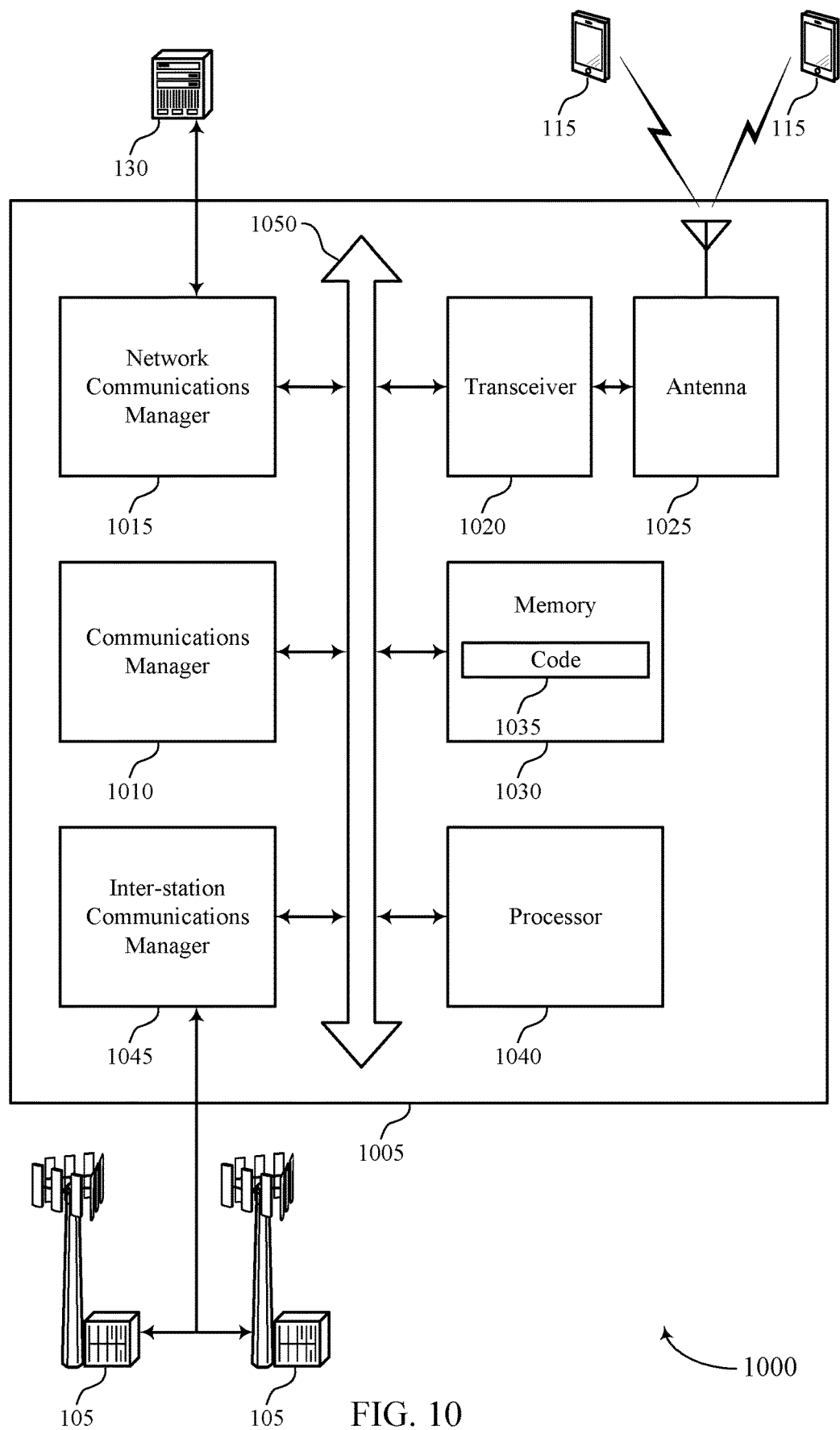
FIG. 10 shows a diagram of a system including a device that supports beam update techniques in beamformed wireless communications in accordance with aspects of the present disclosure.

FIG. 10 shows a diagram of a system 1000 including a device 1005 that supports beam update techniques in beamformed wireless communications in accordance with aspects of the present disclosure. The device 1005 may be an example of or include the components of device 705, device 805, or a base station 105 as described herein. The device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in electronic communication via one or more buses (e.g., bus 1050).

The communications manager 1010 may establish a connection with a UE via one or more transmission beams, receive, from the UE, an indication that the UE supports a beam update procedure that is initiated by a MAC-CE communication to update one or more beamforming parameters of the one or more transmission beams, transmit the MAC-CE communication to the UE to initiate the beam update procedure, the MAC-CE communication to the UE indicating one or more aperiodic SRS resources to be used in the beam update procedure, and perform the beam update procedure, based on the MAC-CE communication, to update one or more beamforming parameters of the one or more transmission beams.

The network communications manager 1015 may manage communications with the core network (e.g., via one or more wired backhaul links). For example, the network communications manager 1015 may manage the transfer of data communications for client devices, such as one or more UEs 115.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some cases, a memory controller may be integrated into processor 1040. The processor 1040 may be configured to execute computer-readable instructions stored in a memory (e.g., the memory 1030) to cause the device 1005 to perform various functions (e.g., functions or tasks supporting beam update techniques in beamformed wireless communications).

The inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
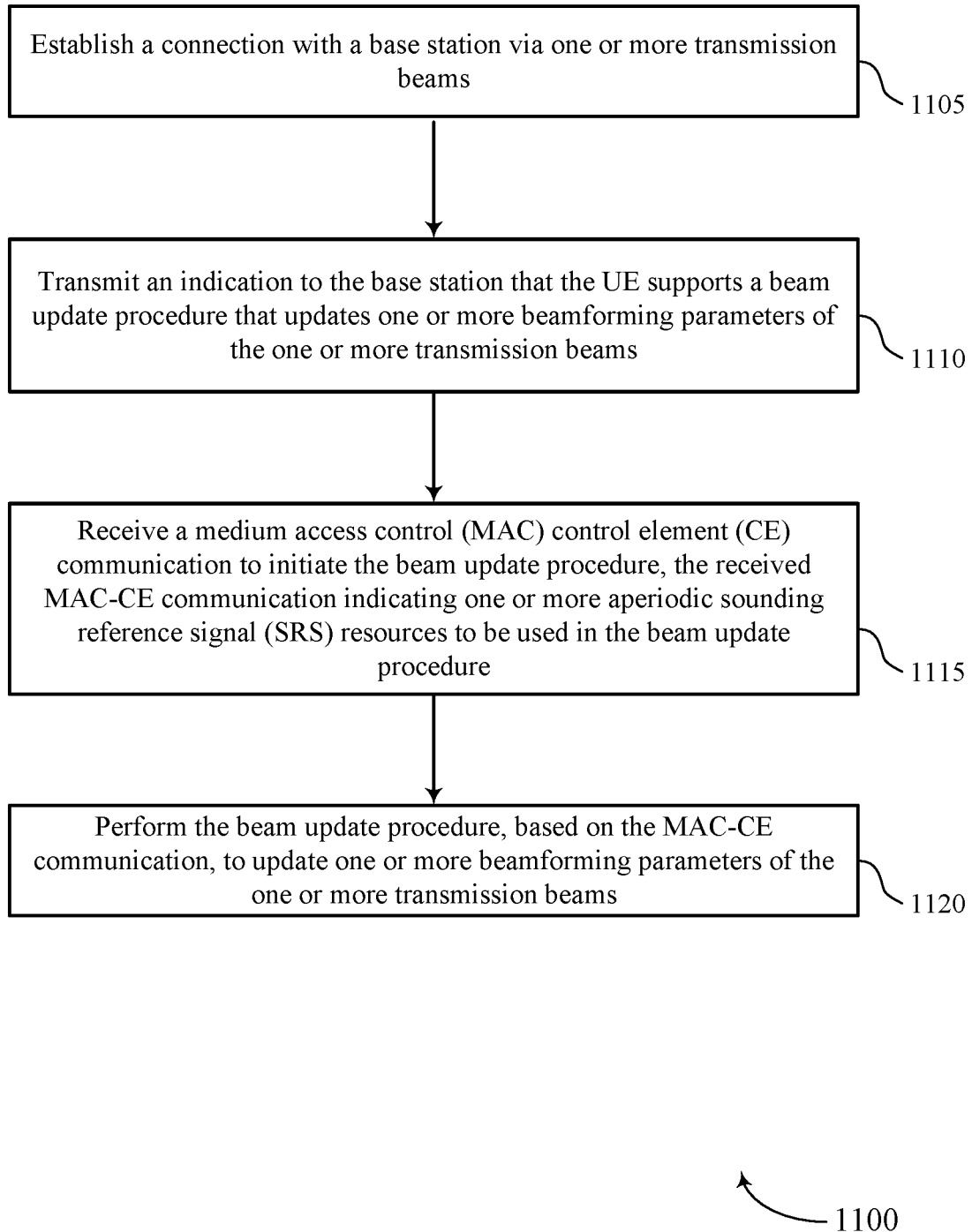
FIGS. 11 through 14 show flowcharts illustrating methods that support beam update techniques in beamformed wireless communications in accordance with aspects of the present disclosure.

FIG. 11 shows a flowchart illustrating a method 1100 that supports beam update techniques in beamformed wireless communications in accordance with aspects of the present disclosure. The operations of method 1100 may be implemented by a UE 115 or its components as described herein. For example, the operations of method 1100 may be performed by a communications manager as described with reference to FIGS. 3 through 6. In some examples, a UE may execute a set of instructions to control the functional elements of the UE to perform the functions described below. Additionally or alternatively, a UE may perform aspects of the functions described below using special-purpose hardware.

At 1105, the UE may establish a connection with a base station via one or more transmission beams. The operations of 1105 may be performed according to the methods described herein. In some examples, aspects of the operations of 1105 may be performed by a connection establishment manager as described with reference to FIGS. 3 through 6.

At 1110, the UE may transmit an indication to the base station that the UE supports a beam update procedure that is initiated by a MAC-CE communication to update one or more beamforming parameters of the one or more transmission beams. The operations of 1110 may be performed according to the methods described herein. In some examples, aspects of the operations of 1110 may be performed by a capability manager as described with reference to FIGS. 3 through 6. In some cases, the indication to the base station is transmitted in one or more of a RRC message, an uplink MAC-CE, a data payload, or any combinations thereof.

At 1115, the UE may receive the MAC-CE communication to initiate the beam update procedure the MAC-CE communication to the UE indicating one or more aperiodic SRS resources to be used in the beam update procedure. The operations of 1115 may be performed according to the methods described herein. In some examples, aspects of the operations of 1115 may be performed by a beam update manager as described with reference to FIGS. 3 through 6.

At 1120, the UE may perform the beam update procedure, based on the MAC-CE communication, to update one or more beamforming parameters of the one or more transmission beams. The operations of 1120 may be performed according to the methods described herein. In some examples, aspects of the operations of 1120 may be performed by a beam update manager as described with reference to FIGS. 3 through 6. In some cases, the beam update procedure identifies updated spatial relation parameters for an uplink beam to be transmitted from the UE to the base station. In some cases, the beam update procedure identifies an uplink TCI for an uplink beam to be transmitted from the UE to the base station.

Figure 12:
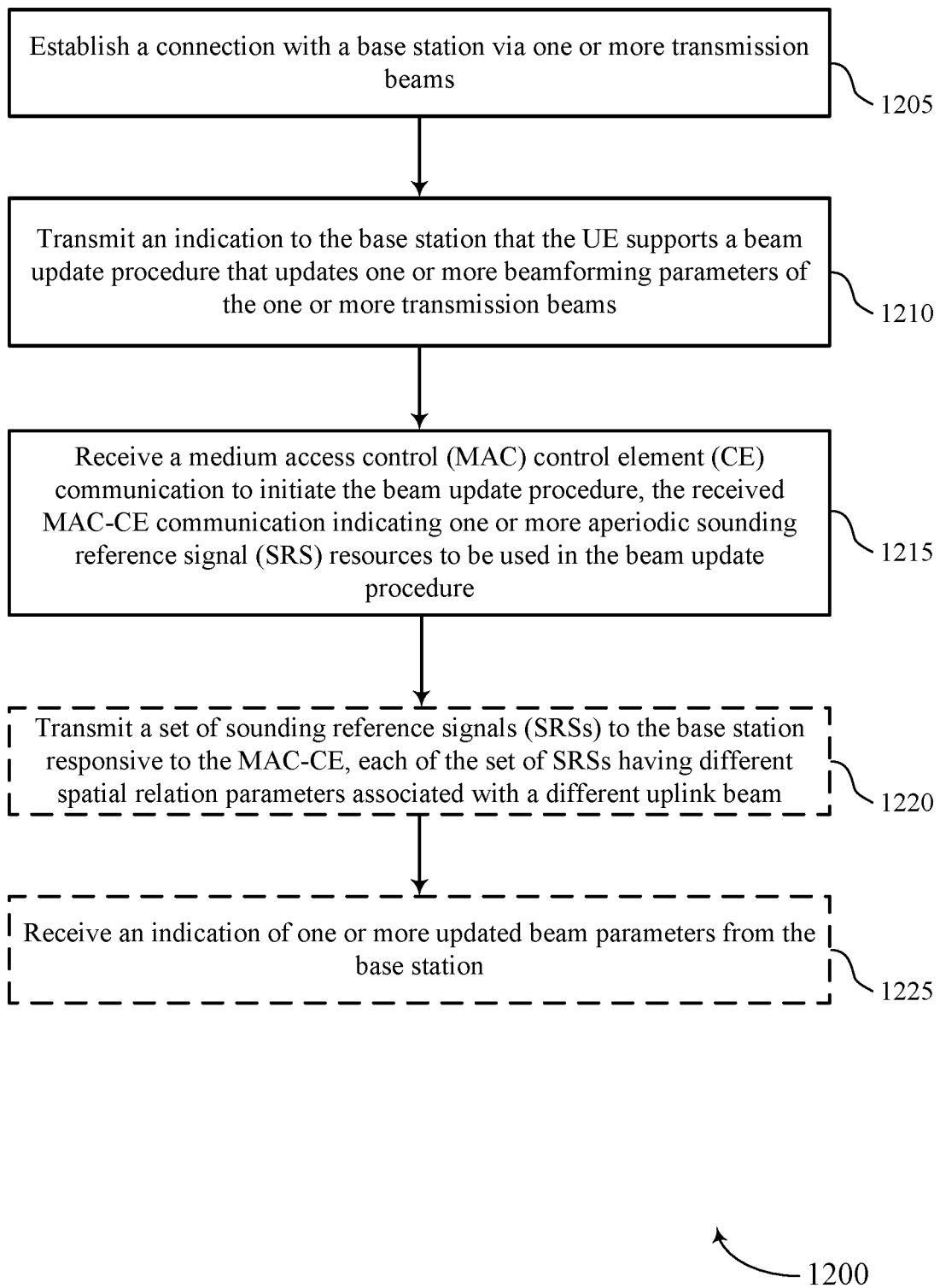

FIG. 12 shows a flowchart illustrating a method 1200 that supports beam update techniques in beamformed wireless communications in accordance with aspects of the present disclosure. The operations of method 1200 may be implemented by a UE 115 or its components as described herein. For example, the operations of method 1200 may be performed by a communications manager as described with reference to FIGS. 3 through 6. In some examples, a UE may execute a set of instructions to control the functional elements of the UE to perform the functions described below. Additionally or alternatively, a UE may perform aspects of the functions described below using special-purpose hardware.

At 1205, the UE may establish a connection with a base station via one or more transmission beams. The operations of 1205 may be performed according to the methods described herein. In some examples, aspects of the operations of 1205 may be performed by a connection establishment manager as described with reference to FIGS. 3 through 6.

At 1210, the UE may transmit an indication to the base station that the UE supports a beam update procedure that is initiated by a MAC-CE communication to update one or more beamforming parameters of the one or more transmission beams. The operations of 1210 may be performed according to the methods described herein. In some examples, aspects of the operations of 1210 may be performed by a capability manager as described with reference to FIGS. 3 through 6.

At 1215, the UE may receive the MAC-CE communication to initiate the beam update procedure, the received MAC-CE communication indicating one or more aperiodic SRS resources to be used in the beam update procedure. The operations of 1215 may be performed according to the methods described herein. In some examples, aspects of the operations of 1215 may be performed by a beam update manager as described with reference to FIGS. 3 through 6.

At 1220, the UE may transmit a set of SRSs to the base station responsive to the MAC-CE, each of the set of SRSs having different spatial relation parameters associated with a different uplink beam. The operations of 1220 may be performed according to the methods described herein. In some examples, aspects of the operations of 1220 may be performed by a reference signal manager as described with reference to FIGS. 3 through 6.

At 1225, the UE may receive an indication of one or more updated beam parameters from the base station. The operations of 1225 may be performed according to the methods described herein. In some examples, aspects of the operations of 1225 may be performed by a beam update manager as described with reference to FIGS. 3 through 6.

Figure 13:
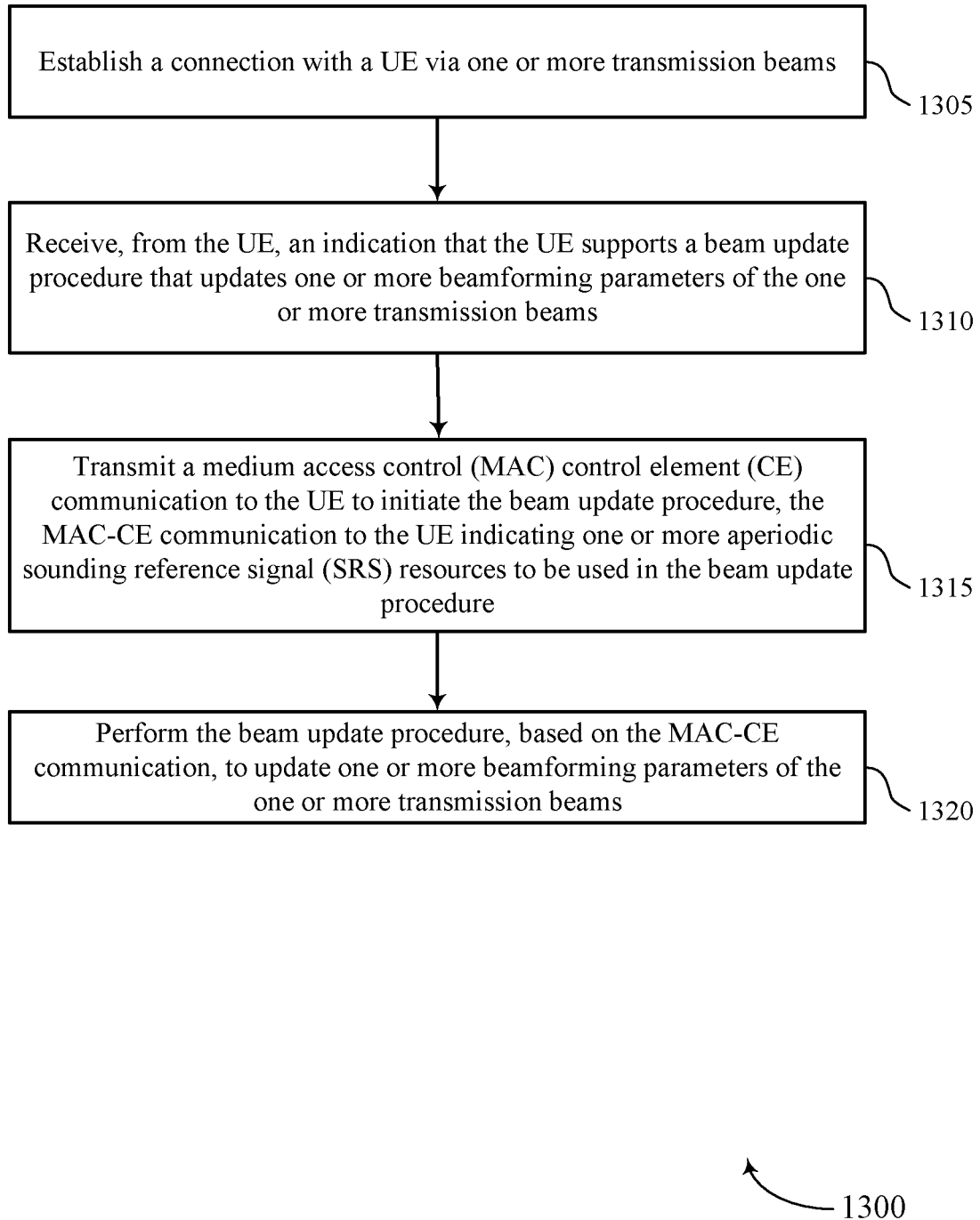

FIG. 13 shows a flowchart illustrating a method 1300 that supports beam update techniques in beamformed wireless communications in accordance with aspects of the present disclosure. The operations of method 1300 may be implemented by a base station 105 or its components as described herein. For example, the operations of method 1300 may be performed by a communications manager as described with reference to FIGS. 7 through 10. In some examples, a base station may execute a set of instructions to control the functional elements of the base station to perform the functions described below. Additionally or alternatively, a base station may perform aspects of the functions described below using special-purpose hardware.

At 1305, the base station may establish a connection with a UE via one or more transmission beams. The operations of 1305 may be performed according to the methods described herein. In some examples, aspects of the operations of 1305 may be performed by a connection establishment manager as described with reference to FIGS. 7 through 10.

At 1310, the base station may receive, from the UE, an indication that the UE supports a beam update procedure that is initiated by a MAC-CE communication to update one or more beamforming parameters of the one or more transmission beams. The operations of 1310 may be performed according to the methods described herein. In some examples, aspects of the operations of 1310 may be performed by a capability manager as described with reference to FIGS. 7 through 10. In some cases, the indication received from the UE is transmitted in one or more of a RRC message, an uplink MAC-CE, a data payload, or any combinations thereof.

At 1315, the base station may transmit the MAC-CE communication to the UE to initiate the beam update procedure, the MAC-CE communication to the UE indicating one or more aperiodic SRS resources to be used in the beam update procedure. The operations of 1315 may be performed according to the methods described herein. In some examples, aspects of the operations of 1315 may be performed by a beam update manager as described with reference to FIGS. 7 through 10.

At 1320, the base station may perform the beam update procedure, based on the MAC-CE communication, to update one or more beamforming parameters of the one or more transmission beams. The operations of 1320 may be performed according to the methods described herein. In some examples, aspects of the operations of 1320 may be performed by a beam update manager as described with reference to FIGS. 7 through 10. In some cases, the beam update procedure identifies updated spatial relation parameters for an uplink beam to be transmitted from the UE to the base station. In some cases, the beam update procedure identifies an uplink TCI for an uplink beam to be transmitted from the UE to the base station.

Figure 14:
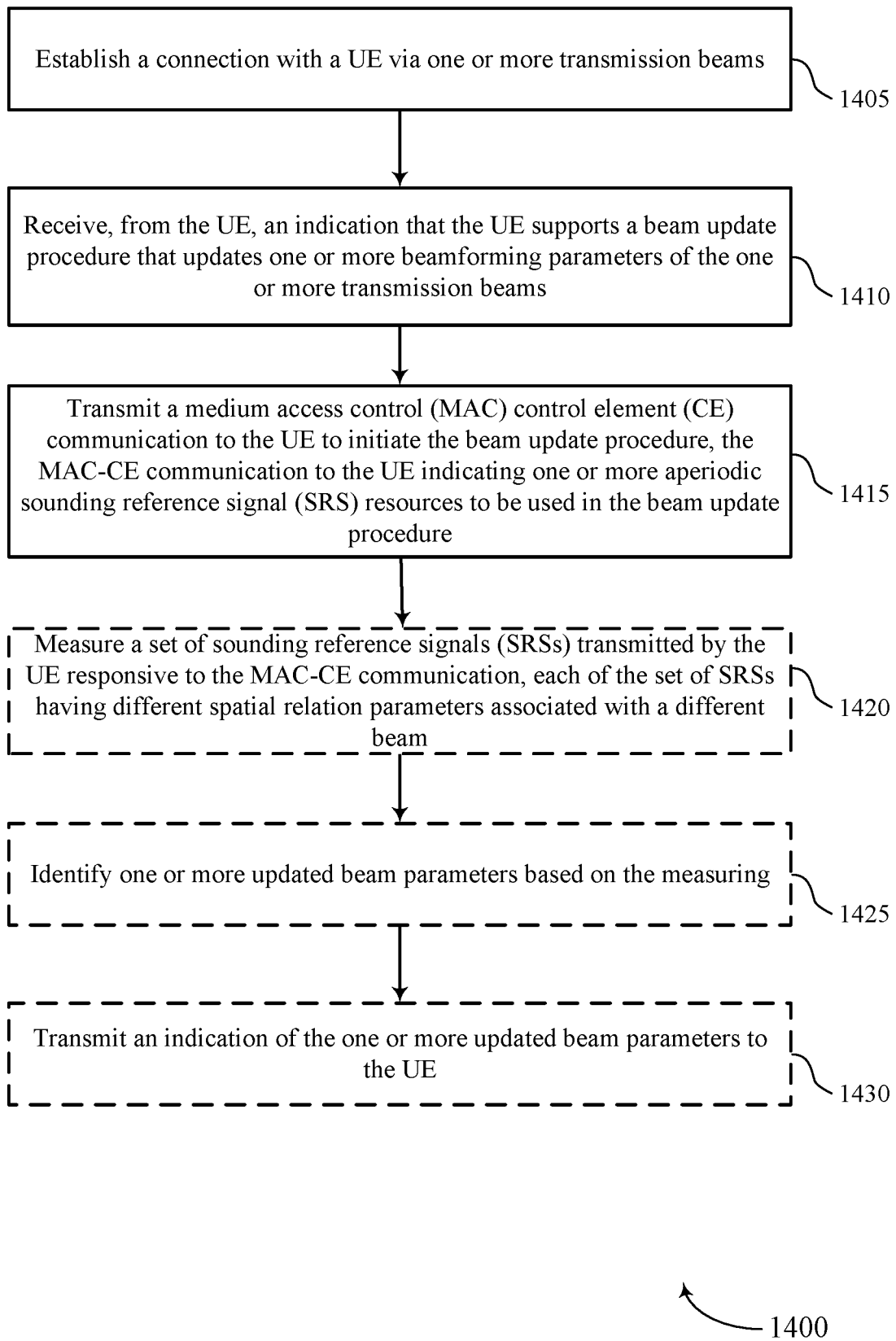

FIG. 14 shows a flowchart illustrating a method 1400 that supports beam update techniques in beamformed wireless communications in accordance with aspects of the present disclosure. The operations of method 1400 may be implemented by a base station 105 or its components as described herein. For example, the operations of method 1400 may be performed by a communications manager as described with reference to FIGS. 7 through 10. In some examples, a base station may execute a set of instructions to control the functional elements of the base station to perform the functions described below. Additionally or alternatively, a base station may perform aspects of the functions described below using special-purpose hardware.

At 1405, the base station may establish a connection with a UE via one or more transmission beams. The operations of 1405 may be performed according to the methods described herein. In some examples, aspects of the operations of 1405 may be performed by a connection establishment manager as described with reference to FIGS. 7 through 10.

At 1410, the base station may receive, from the UE, an indication that the UE supports a beam update procedure that is initiated by a MAC-CE communication to update one or more beamforming parameters of the one or more transmission beams. The operations of 1410 may be performed according to the methods described herein. In some examples, aspects of the operations of 1410 may be performed by a capability manager as described with reference to FIGS. 7 through 10.

At 1415, the base station may transmit the MAC-CE communication to the UE to initiate the beam update procedure, the MAC-CE communication to the UE indicating one or more aperiodic SRS resources to be used in the beam update procedure. The operations of 1415 may be performed according to the methods described herein. In some examples, aspects of the operations of 1415 may be performed by a beam update manager as described with reference to FIGS. 7 through 10.

At 1420, the base station may measure a set of SRSs transmitted by the UE responsive to the MAC-CE communication, each of the set of SRSs having different spatial relation parameters associated with a different beam. The operations of 1420 may be performed according to the methods described herein. In some examples, aspects of the operations of 1420 may be performed by a reference signal manager as described with reference to FIGS. 7 through 10.

At 1425, the base station may identify one or more updated beam parameters based on the measuring. The operations of 1425 may be performed according to the methods described herein. In some examples, aspects of the operations of 1425 may be performed by a beam update manager as described with reference to FIGS. 7 through 10.

At 1430, the base station may transmit an indication of the one or more updated beam parameters to the UE. The operations of 1430 may be performed according to the methods described herein. In some examples, aspects of the operations of 1430 may be performed by a beam update manager as described with reference to FIGS. 7 through 10.

It should be noted that the methods described herein describe possible implementations, and that the operations and the processes may be rearranged or otherwise modified and that other implementations are possible. Further, aspects from two or more of the methods may be combined.

Example 1

A method for wireless communication at a UE, comprising: establishing a connection with a base station via one or more transmission beams; transmitting an indication to the base station that the UE supports a beam update procedure that is initiated by a MAC-CE communication to update one or more beamforming parameters of the one or more transmission beams; receiving the MAC-CE communication to initiate the beam update procedure, wherein the received MAC-CE communication indicates one or more aperiodic SRS resources to be used in the beam update procedure; and performing the beam update procedure, based at least in part on the MAC-CE communication, to update one or more beamforming parameters of the one or more transmission beams.

Example 2

The method of example 1, wherein the beam update procedure identifies updated spatial relation parameters for an uplink beam to be transmitted from the UE to the base station.

Example 3

The method of example 1, wherein the beam update procedure identifies an uplink TCI state for an uplink beam to be transmitted from the UE to the base station.

Example 4

The method of example 1, wherein the indication to the base station is transmitted in one or more of a RRC message, an uplink MAC-CE, a data payload, or any combinations thereof.

Example 5

The method of example 1, wherein the performing the beam update procedure comprises: transmitting a plurality of SRSs to the base station responsive to the MAC-CE, each of the plurality of SRSs having different spatial relation parameters associated with a different uplink beam; and receiving an indication of one or more updated beam parameters from the base station.

Example 6

An apparatus for use in the method of wireless communication of any of examples 1-5.

Example 7

An apparatus, comprising means for performing the method of wireless communication of any of examples 1-5.

Example 8

A computer readable medium for the method of wireless communication of any of examples 1-5.

Example 9

A method for wireless communication at a base station, comprising: establishing a connection with a UE via one or more transmission beams; receiving, from the UE, an indication that the UE supports a beam update procedure that is initiated by a MAC-CE communication to update one or more beamforming parameters of the one or more transmission beams; transmitting the MAC-CE communication to the UE to initiate the beam update procedure, wherein the MAC-CE communication to the UE indicates one or more aperiodic SRS resources to be used in the beam update procedure; and performing the beam update procedure, based at least in part on the MAC-CE communication, to update one or more beamforming parameters of the one or more transmission beams.

Example 10

The method of example 9, wherein the beam update procedure identifies updated spatial relation parameters for an uplink beam to be transmitted from the UE to the base station.

Example 11

The method of example 9, wherein the beam update procedure identifies an uplink TCI state for an uplink beam to be transmitted from the UE to the base station.

Example 12

The method of example 9, wherein the indication received from the UE is transmitted in one or more of a RRC message, an uplink MAC-CE, a data payload, or any combinations thereof.

Example 13

The method of example 9, wherein the performing the beam update procedure comprises: measuring a plurality of SRSs transmitted by the UE responsive to the MAC-CE communication, each of the plurality of SRSs having different spatial relation parameters associated with a different beam; identifying one or more updated beam parameters based at least in part on the measuring; and transmitting an indication of the one or more updated beam parameters to the UE.

Example 14

An apparatus for use in the method of wireless communication of any of examples 9-13.

Example 15

An apparatus, comprising means for performing the method of wireless communication of any of examples 9-13.

Example 16

A computer readable medium for the method of wireless communication of any of examples 9-13.

Example 17

An apparatus for wireless communication for a UE, comprising: a processor and memory coupled to the processor. The processor and memory are configured to: establish a connection with a base station via one or more transmission beams; transmit an indication to the base station that the UE supports a beam update procedure that is initiated by a MAC-CE communication to update one or more beamforming parameters of the one or more transmission beams; receive the MAC-CE communication to initiate the beam update procedure, wherein the received MAC-CE communication indicates one or more aperiodic SRS resources to be used in the beam update procedure; and perform the beam update procedure, based at least in part on the MAC-CE communication, to update one or more beamforming parameters of the one or more transmission beams.

Example 18

The apparatus of example 17, wherein the processor and memory are configured to identify updated spatial relation parameters for an uplink beam to be transmitted from the UE to the base station.

Example 19

The apparatus of example 17, wherein the processor and memory are configured to identify an uplink TCI state for an uplink beam to be transmitted from the UE to the base station.

Example 20

The apparatus of example 17, wherein the indication to the base station is transmitted in one or more of a RRC message, an uplink MAC-CE, a data payload, or any combinations thereof.

Example 21

The apparatus of example 17, wherein the processor and memory are configured to: transmit a plurality of SRSs to the base station responsive to the MAC-CE, each of the plurality of SRSs having different spatial relation parameters associated with a different uplink beam; and receive an indication of one or more updated beam parameters from the base station.

Example 22

An apparatus for wireless communication at a base station, comprising: a processor and memory coupled to the processor. The memory and processor are configured to: establish a connection with a UE via one or more transmission beams; receive, from the UE, an indication that the UE supports a beam update procedure that is initiated by a MAC-CE communication to update one or more beamforming parameters of the one or more transmission beams; transmit the MAC-CE communication to the UE to initiate the beam update procedure, wherein the MAC-CE communication to the UE indicates one or more aperiodic SRS resources to be used in the beam update procedure; and perform the beam update procedure, based at least in part on the MAC-CE communication, to update one or more beamforming parameters of the one or more transmission beams.

Example 23

The apparatus of example 22, wherein the processor and memory are configured to identify updated spatial relation parameters for an uplink beam to be transmitted from the UE to the base station.

Example 24

The apparatus of example 22, wherein the processor and memory are configured to identify an uplink TCI state for an uplink beam to be transmitted from the UE to the base station.

Example 25

The apparatus of example 22, wherein the indication received from the UE is transmitted in one or more of a RRC message, an uplink MAC-CE, a data payload, or any combinations thereof.

Example 26

The apparatus of example 22, wherein the processor and memory are configured to: measure a plurality of SRSs transmitted by the UE responsive to the MAC-CE communication, each of the plurality of SRSs having different spatial relation parameters associated with a different beam; identify one or more updated beam parameters based at least in part on the measuring; and transmit an indication of the one or more updated beam parameters to the UE.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

In LTE/LTE-A networks, including such networks described herein, the term eNB may for example be used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell may cover a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any type of processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    establishing a connection with a base station via one or more transmission beams;
    transmitting an indication to the base station that the UE supports spatial relation updates for one or more aperiodic sounding reference signal (SRS) resources associated with a beam update procedure;
    receiving a medium access control (MAC) control element (CE) communication to initiate the beam update procedure, wherein the received MAC-CE communication indicates at least one aperiodic SRS resource to be used in the beam update procedure; and
    performing the beam update procedure, based at least in part on the received MAC-CE communication, to update one or more beamforming parameters of the one or more transmission beams.

2. The method of claim 1, wherein the beam update procedure identifies updated spatial relation parameters for an uplink beam to be transmitted from the UE to the base station.

3. The method of claim 1, wherein the beam update procedure identifies an uplink transmission configuration indicator (TCI) state for an uplink beam to be transmitted from the UE to the base station.

4. The method of claim 1, wherein the indication to the base station is transmitted in one or more of a radio resource control (RRC) message, an uplink MAC-CE, a data payload, or any combinations thereof.

5. The method of claim 1, wherein the performing the beam update procedure comprises:
    transmitting a plurality of SRSs to the base station responsive to the received MAC-CE communication, each of the plurality of SRSs having different spatial relation parameters associated with a different uplink beam; and
    receiving an indication of one or more updated beam parameters from the base station.

6. A method for wireless communication at a base station, comprising:
    establishing a connection with a user equipment (UE) via one or more transmission beams;
    receiving, from the UE, an indication that the UE supports spatial relation updates for one or more aperiodic sounding reference signal (SRS) resources associated with a beam update procedure;

transmitting a medium access control (MAC) control element (CE) communication to the UE to initiate the beam update procedure, wherein the MAC-CE communication to the UE indicates at least one aperiodic SRS resource to be used in the beam update procedure; and performing the beam update procedure, based at least in part on the MAC-CE communication, to update one or more beamforming parameters of the one or more transmission beams.

7. The method of claim 6, wherein the beam update procedure identifies updated spatial relation parameters for an uplink beam to be transmitted from the UE to the base station.

8. The method of claim 6, wherein the beam update procedure identifies an uplink transmission configuration indicator (TCI) state for an uplink beam to be transmitted from the UE to the base station.

9. The method of claim 6, wherein the indication received from the UE is transmitted in one or more of a radio resource control (RRC) message, an uplink MAC-CE, a data payload, or any combinations thereof.

10. The method of claim 6, wherein the performing the beam update procedure comprises:

measuring a plurality of SRSs transmitted by the UE responsive to the MAC-CE communication, each of the plurality of SRSs having different spatial relation parameters associated with a different beam;

identifying one or more updated beam parameters based at least in part on the measuring; and transmitting an indication of the one or more updated beam parameters to the UE.

11. An apparatus for wireless communication for a user equipment (UE), comprising:

a processor;

memory coupled to the processor, the processor and the memory configured to:

establish a connection with a base station via one or more transmission beams;

transmit an indication to the base station that the UE supports spatial relation updates for one or more aperiodic sounding reference signal (SRS) resources associated with a beam update procedure;

receive a medium access control (MAC) control element (CE) communication to initiate the beam update procedure, wherein the received MAC-CE communication indicates at least one aperiodic SRS resource to be used in the beam update procedure; and perform the beam update procedure, based at least in part on the received MAC-CE communication, to update one or more beamforming parameters of the one or more transmission beams.

12. The apparatus of claim 11, wherein the processor and the memory are configured to identify updated spatial relation parameters for an uplink beam to be transmitted from the UE to the base station.

13. The apparatus of claim 11, wherein the processor and the memory are configured to identify an uplink transmission configuration indicator (TCI) state for an uplink beam to be transmitted from the UE to the base station.

14. The apparatus of claim 11, wherein the indication to the base station is transmitted in one or more of a radio resource control (RRC) message, an uplink MAC-CE, a data payload, or any combinations thereof.

15. The apparatus of claim 11, wherein the processor and the memory are configured to:

transmit a plurality of SRSs to the base station responsive to the received MAC-CE communication, each of the plurality of SRSs having different spatial relation parameters associated with a different uplink beam; and receive an indication of one or more updated beam parameters from the base station.

16. An apparatus for wireless communication at a base station, comprising:

a processor;

memory coupled to the processor, the processor and the memory are configured to:

establish a connection with a user equipment (UE) via one or more transmission beams;

receive, from the UE, an indication that the UE supports spatial relation updates for one or more aperiodic sounding reference signal (SRS) resources associated with a beam update procedure;

transmit a medium access control (MAC) control element (CE) communication to the UE to initiate the beam update procedure, wherein the MAC-CE communication to the UE indicates at least one aperiodic SRS resource to be used in the beam update procedure; and perform the beam update procedure, based at least in part on the MAC-CE communication, to update one or more beamforming parameters of the one or more transmission beams.

17. The apparatus of claim 16, wherein the processor and the memory are configured to identify updated spatial relation parameters for an uplink beam to be transmitted from the UE to the base station.

18. The apparatus of claim 16, wherein the processor and the memory are configured to identify an uplink transmission configuration indicator (TCI) state for an uplink beam to be transmitted from the UE to the base station.

19. The apparatus of claim 16, wherein the indication received from the UE is transmitted in one or more of a radio resource control (RRC) message, an uplink MAC-CE, a data payload, or any combinations thereof.

20. The apparatus of claim 16, wherein the processor and the memory are configured to:

measure a plurality of SRSs transmitted by the UE responsive to the MAC-CE communication, each of the plurality of SRSs having different spatial relation parameters associated with a different beam;

identify one or more updated beam parameters based at least in part on the measuring; and transmit an indication of the one or more updated beam parameters to the UE.

21. The method of claim 1, wherein the indication to the base station indicates that the UE supports spatial relation updates for one or more aperiodic SRS resources using a MAC-CE from the base station.

22. The method of claim 6, wherein the indication from the UE indicates that the UE supports spatial relation updates for one or more aperiodic SRS resources using a MAC-CE from the base station.

23. The apparatus of claim 11, wherein the indication to the base station indicates that the UE supports spatial relation updates for one or more aperiodic SRS resources using a MAC-CE from the base station.

24. The apparatus of claim 16, wherein the indication from the UE indicates that the UE supports spatial relation updates for one or more aperiodic SRS resources using a MAC-CE from the base station.

* * * * *